United States Patent
Shoji et al.

(10) Patent No.: US 10,252,875 B2
(45) Date of Patent: Apr. 9, 2019

(54) ROLLER COVERED BY A COVERING COMPRISING KNIT FABRIC AND DEVICE EMPLOYING SAME

(71) Applicant: SANWA TECHNO CO., LTD., Kobe-shi, Hyogo (JP)

(72) Inventors: Susumu Shoji, Kobe (JP); Kazuro Fukui, Kobe (JP); Takaomi Kurahashi, Ayabe (JP)

(73) Assignees: SANWA TECHNO CO., LTD., Kobe-shi (JP); Susumu Shoji, Kobe-shi (JP)

( * ) Notice: Subject to any disclaimer, the term of this patent is extended or adjusted under 35 U.S.C. 154(b) by 239 days.

(21) Appl. No.: 15/036,969

(22) PCT Filed: Nov. 16, 2013

(86) PCT No.: PCT/JP2013/080959
§ 371 (c)(1),
(2) Date: May 16, 2016

(87) PCT Pub. No.: WO2015/072024
PCT Pub. Date: May 21, 2015

(65) Prior Publication Data
US 2016/0289034 A1   Oct. 6, 2016

(51) Int. Cl.
*B65H 5/06* (2006.01)
*B65H 5/22* (2006.01)
(Continued)

(52) U.S. Cl.
CPC ............. *B65H 27/00* (2013.01); *B65G 39/07* (2013.01); *B65H 5/06* (2013.01); *B65H 5/226* (2013.01);
(Continued)

(58) Field of Classification Search
CPC ........ B65G 15/54; B65G 15/16; B65G 39/07; B65H 5/02; B65H 2404/271; B65H 27/00;
(Continued)

(56) References Cited

U.S. PATENT DOCUMENTS 2,278,926 A * 4/1942 Hartwell ................ B65G 15/54
66/202
2,804,762 A * 9/1957 Fumihiko ................ B41N 7/04
492/48

(Continued)

FOREIGN PATENT DOCUMENTS

JP    56-161255 A    12/1981
JP    62-100956 U     6/1987
(Continued)

OTHER PUBLICATIONS

International Search Report dated Feb. 18, 2014, issued in counterpart International Application No. PCT/JP2013/080959 (2 pages).
(Continued)

*Primary Examiner* — Jason L Vaughan
(74) *Attorney, Agent, or Firm* — Westerman, Hattori, Daniels & Adrian, LLP

(57) ABSTRACT

A roller has knit fabric at its surface and which is employed in an apparatus permitting achievement of conservation of resources, conservation of energy, and low cost, and an apparatus employing such a roller. Roller 1 covered with covering 3 including knit fabric at its surface causes conveyance, supply, or other such movement of an object, or uses an to dry or cool an object as it is moved, or rotates while causing an object to be subjected to suction. Knit fabric 3a covering the roller surface has gaps having air permeability and steps 6 comprising stripes in a pattern of bands at the front and back surfaces; the stripes in the pattern of bands are perpendicular to the direction of rotation at the (Continued)

surface of the rotating support body 2. Loops making up knit fabric 3a have domains of small loops 4c and large loops 4b.

15 Claims, 25 Drawing Sheets

(51) Int. Cl.
     *D04B 1/22*          (2006.01)
     *B65G 39/07*         (2006.01)
     *B65H 27/00*         (2006.01)
     *F16C 13/00*         (2006.01)

(52) U.S. Cl.
     CPC .............. *D04B 1/225* (2013.01); *F16C 13/00* (2013.01); *B65H 2401/141* (2013.01); *B65H 2401/242* (2013.01); *B65H 2404/5213* (2013.01); *B65H 2406/332* (2013.01); *Y02P 70/633* (2015.11)

(58) Field of Classification Search
     CPC .... B65H 5/06; B65H 5/226; B65H 2401/141; B65H 2401/242; F16G 1/04; D04B 1/22; D04B 1/225
     See application file for complete search history.

(56) References Cited

U.S. PATENT DOCUMENTS

| | | | | |
|---|---|---|---|---|
| 3,180,115 A * | 4/1965 | Marshall | ................. | B41N 7/04 139/421 |
| 3,452,414 A * | 7/1969 | Schiel | ................. | D06C 15/08 492/22 |
| 3,926,701 A * | 12/1975 | Nishiwaki | ................. | B41L 25/18 101/148 |
| 4,043,142 A * | 8/1977 | Marshall | ................. | B41L 25/18 66/170 |
| 4,404,999 A * | 9/1983 | Woodall, Jr. | ................. | D03D 27/00 139/391 |
| 4,492,012 A * | 1/1985 | Pala | ................. | B41F 35/00 29/895.32 |
| 4,531,386 A * | 7/1985 | England | ................. | D04B 1/04 66/190 |
| 4,614,094 A * | 9/1986 | Kakihana | ................. | B41F 7/26 66/170 |
| 4,624,116 A * | 11/1986 | Rogers | ................. | A44B 18/0034 24/445 |
| 4,838,046 A * | 6/1989 | Yasukawa | ................. | B41N 7/04 101/148 |
| 5,150,738 A * | 9/1992 | Nishiwaki | ................. | B41N 7/04 139/387 R |
| 5,158,171 A * | 10/1992 | Graff | ................. | B65G 15/54 198/842 |
| 6,120,864 A * | 9/2000 | Chiricosta | ................. | B08B 6/00 15/1.51 |
| 7,048,011 B2 * | 5/2006 | DeMoore | ................. | B41F 22/00 101/419 |
| 8,783,448 B2 * | 7/2014 | Shoji | ................. | B65G 15/54 198/844.1 |
| 8,784,940 B2 * | 7/2014 | Newhouse | ................. | B65H 27/00 427/355 |
| 9,334,122 B2 * | 5/2016 | Shoji | ................. | B65G 15/30 |
| 9,617,077 B2 * | 4/2017 | Shoji | ................. | B65G 15/54 |
| 9,637,315 B2 * | 5/2017 | Johanson | ................. | B65G 21/2036 |
| 9,751,710 B2 * | 9/2017 | Newhouse | ................. | B65H 27/00 |
| 9,845,216 B2 * | 12/2017 | Newhouse | ................. | B65H 27/00 |
| 9,908,733 B2 * | 3/2018 | Roska | ................. | B65H 27/00 |
| 2012/0241549 A1 * | 9/2012 | Newhouse | ................. | B65H 27/00 242/564.4 |
| 2015/0217960 A1 * | 8/2015 | Newhouse | ................. | B65H 23/0251 226/1 |
| 2015/0246776 A1 * | 9/2015 | Shoji | ................. | B65H 5/02 198/846 |
| 2015/0274483 A1 * | 10/2015 | Newhouse | ................. | B65H 19/28 242/613 |
| 2016/0185549 A1 * | 6/2016 | Roska | ................. | B65H 27/00 226/1 |
| 2016/0229653 A1 * | 8/2016 | Shoji | ................. | B65H 27/00 |
| 2017/0150588 A1 * | 5/2017 | Retterath | ................. | H05F 3/02 |
| 2017/0275121 A1 * | 9/2017 | Retterath | ................. | B65H 27/00 |

FOREIGN PATENT DOCUMENTS

| | | |
|---|---|---|
| JP | 64-34794 A | 2/1989 |
| JP | 3-71848 A | 3/1991 |
| JP | 5-45034 U | 6/1993 |
| JP | 8-53251 A | 2/1996 |
| JP | 8-239146 A | 9/1996 |
| JP | 9-67053 A | 3/1997 |
| JP | 10-204779 A | 8/1998 |
| JP | 11-139588 A | 5/1999 |
| JP | 2007-254141 A | 10/2007 |
| JP | 2008-114981 A | 5/2008 |

OTHER PUBLICATIONS

Decision to Grant a Patent dated Apr. 8, 2014, issued in counterpart Japanese Patent Application No. 2014-509018, (3 pages).

\* cited by examiner (a)　　　　　　　　　(b)

(a)　　　　　　　　　(b)

(a)  (b)

(a)  (b)

(a)  (b)

(a)  (b)  (c)  (d)

(a)  (b)  (c)  (d)

ROLLER COVERED BY A COVERING COMPRISING KNIT FABRIC AND DEVICE EMPLOYING SAME

TECHNICAL FIELD

The present invention relates to a roller for moving or conveying sheet-shaped paper, cloth, film or the like, and to an apparatus employing such a roller; and in particular, in the context of a roller that sucks dust or the like while rotating or to an apparatus employing such a roller, relates to a roller for which friction at a surface thereof is required or a roller for which suction or cooling and possession of air permeability are required, as well as to an apparatus employing such a roller; for example, a roller employed in any of various types of printing apparatus, coating apparatus, calendaring apparatus, slitter apparatus, laminating apparatus, textile processing apparatus, packaging apparatus, automatic cash dispenser, or other such conveyor apparatus or the like comprising a belt conveyor or roller conveyor as well as to an apparatus in which such a roller is employed.

BACKGROUND ART

Conventionally, rollers covered by resin tubes or fiber-like substances have been used as rollers in conveyors and other such conveyor apparatuses and as rollers in conveyor units in printing apparatuses. Furthermore, among the rollers which are employed for feed, movement, or conveyance of sheet-like objects through utilization of friction, solid rubber rollers which have high coefficient of friction are usually employed. Where such a roller conveys as conveyed object in the form of sheet-like paper, film, fabric, or the like, paper dust, dust, fibrous waste, and the like will adhere to the surface of the roller, causing degradation of conveyance characteristics. To address this, rollers in which recesses and projections are provided at the surface of the roller and the like have been proposed, these being employed in a variety of apparatuses. Furthermore, to prevent paper dust, dust, fibrous waste, and the like from adhering to the roller surface, rollers covered with tubes comprising fluorocarbon resin having low coefficient of friction, and apparatuses that clean roller surfaces on which paper dust, dust, fibrous waste, or the like has adhered, have been developed.

Moreover, as suction rollers having air permeability for cooling or suction, rollers having a multiplicity of suction holes formed at the surface thereof and rollers which are cylindrical bodies having a multiplicity of slits formed therein and which are formed such that fibril-like material is wound thereabout have been developed, these being used as rollers in apparatuses for manufacture of resin film and/or sheet. It so happens that in connection with rotary presses which are printing apparatuses, from the standpoints of improvement of quality and improvement of productivity, and from the standpoint of maintaining a clean environment as well, apparatuses and rollers capable of conveying printed matter without coining in contact with the surfaces of the printed matter that are coated by ink are desirable.

On the other hand, as a paper feed apparatus for a printer, an apparatus comprising a cover member made of woven cloth has been proposed in which an outer surface of a shell is coated with a low-friction material, this is further covered with a cover member made of woven cloth, this cover member made of woven cloth is impregnated with an ink-adhesion-preventing agent and is moreover formed into the shape of a cylindrical seamless sleeve having open ends (see, for example, Patent Reference No. 1).

Moreover, as a roller for conveying that can be easily covered by anyone and that is capable of being manufactured at low cost, a cover has been proposed in which yarn comprising heat-shrinkable fiber that has been coated by silicone resin having plentiful lubricity, mold-releasability, and wear resistance is employed to manufacture a seamless tube comprising knit fabric, braided fabric, or woven fabric, this seamless rube being used to cover the outside circumference of a roller core (see, for example, Patent Reference No. 2).

Moreover, there has been a proposal in which water-soluble polyvinyl alcohol fibers are stranded together in a reversible pattern to form a cylindrical knit fabric, this cylindrical kin fabric being used as cover material to cover a roller for conveying magnetic tape (see, for example, Patent Reference No. 3).

Furthermore, in the context of a roller for conveying plate glass which has been softened by heating, to achieve increase in the life of a sleeve comprising fiber knit fabric which covers a roller core member and reduction in plate glass manufacturing and processing cost, a glass conveying roller has been proposed which is a roller for conveying plate glass which has been softened by heating and in which a sleeve comprising knit fabric made of heat-resistant inorganic fiber is used to cover the outside circumference of a roller core member, a protective covering moreover being arranged at the surface of said sleeve (see, for example, Patent Reference No. 4).

Moreover, a conveying roller ensuring interfacial peel strength has been proposed which is a conveying roller that, even without use of adhesive, has adequate required metal core/fluorocarbon resin tube interfacial peel strength, and in which, in causing the outside circumferential surface of the metal core to be covered by a heat-shrinkable tube made of fluorocarbon resin, at the outside circumferential surface of this metal core, taking the outer contour in the circumferential direction of the metal rod stock constituting the metal core starting material as an imaginary line, groups of peak-like ridges that protrude beyond this imaginary line are formed in regular fashion in a parallel state on the outside circumferential surface of the metal core, at which time the depth of the valleys between mutually adjacent groups of peak-like ridges is made to be at least 0.05 mm, as a result of which the conveying roller is such that interfacial peel strength is ensured even when adhesive is not used in combination therewith, permitting achievement of prevention of dislocation and improvement in productivity (see, for example, Patent Reference No. 5).

Moreover, a suction roller has been proposed which is a cylindrical body having a multiplicity of slits formed with fibril-like material wound thereabout, and formed such that engaged with this cylindrical body is a tubular object comprising wire mesh, screen, nonwoven fabric, woven fabric, or paper comprising synthetic fibers or natural fibers, or plastic or metal which is porous (see, for example, Patent Reference No. 6).

Furthermore, a sheet conveyor apparatus has been proposed for increasing intimacy of contact between a suction roller and a sheet traveling along the outside circumferential surface thereof, for permitting definitive correction of positional dislocation due to travel, and for causing offset defects not to be produced, which is a sheet conveyor apparatus equipped with a suction roller that supports a moving and traveling sheet at the outside circumferential surface thereof, this suction roller being such that formed at the outermost peripheral surface region of a cylindrical roller made of metal there is a mesh cylinder in which a multiplicity of suction holes of diameter not greater than 1 mm are formed through creation of openings by means of etching (see, for example, Patent Reference No. 7).

Moreover, a roller has been proposed which comprises a rubber elastic body in which a multiplicity of grooves for attenuation of wear are formed at the outside circumferential surface of a roll that comes in contact with a sheet-shaped article (see, for example, Patent Reference No. 8).

As indicated at the foregoing Patent References, cover materials for rollers include woven fabric, paper, nonwoven fabric, wire mesh, and knit fabric, as well as rubber tubing, shrink tubing, and so forth. Furthermore, cover materials on which coating or other such treatment has been carried out, coverings comprising heat-resistant materials, knit fabrics in which elastomers have been embedded, and the like have been developed. However, with conventional coverings, where the covering is constituted from a fibrous or filamentous substance, rubbing contact with the conveyed object and compression under load has caused occurrence of fraying due to breakage of filaments, and as this fraying has progressed it has caused occurrence of problems affecting conveyance characteristics and other such functions. Furthermore, with such rollers, for maintenance of gripping characteristics or surface protection, coating treatment is carried out in which a coating agent is used to impart the surface of the roller with a coating layer, so as to improve the coefficient of friction or protect the underlying fabric. However, where coatings are employed, sliding contact causes the coating layer to wear, as a result of which there is the problem that life is shortened. To increase life, it therefore becomes necessary to increase the thickness of the coating layer, as a result of which there is the problem that manufacturing cost is increased.

With rollers covered with the foregoing rubber tubing, shrink tubing, and other such covering materials, tubing materials include fluorinated-type, polyolefin-type, and silicone-type, as well as PET, PVC, rubber-type (EP rubber), and so forth, and there is also woven fabric, knit fabric, and so forth. Where tubing comprising such materials is employed there will be the problem of achieving adhesion to the core. For adhesion to the core, heat-shrinkable tubing which is made to contract through use of heat is therefore typically used. In addition, where lubricity or the like are required at the surface, resin-type heat-shrink tubing is employed; and in particular where low coefficient of friction is required, fluoro-type heat-shrinkable tubing is employed. Furthermore, where gripping characteristics are required at the surface, rubber-type tubing is employed.

Where such resin-type heat-shrink tubing is employed, it is ordinarily the case that circumstances related to tubing manufacturing method cause the surface to be slippery and to have poor gripping characteristics. They are therefore not suited for applications where conveyed objects are conveyed under low load. But in apparatuses where rollers act together to form a nip at high load to allow gripping force to be obtained, resin-type heat-shrink tubing is often used. Moreover, because fluoro-type and silicone-type resin tubings are heat-resistant, these are employed in rollers that undergo heating. However, with rollers employing such resin tubing, because circumstances related to manufacture of the tubing cause the inner and outer surfaces to be slippery, while they are appropriate as rollers where smooth surfaces are required, occurrence of slipping and the like can result in feed nonuniformities in applications where conveying occurs with nips at low loads. Moreover, where scratches or the like appear on the tubing, contaminant adheres to such scratches, as a result of which defects are produced on the conveyed object. With tubing comprising knit fabric, heat-shrink fiber is employed at the yarn and heat-shrinking is carried out to achieve intimate contact with the core, but there is the problem that there is fraying of yarn at the end faces of the tubing. Processing at the end faces is therefore required.

Next, with rollers used for ventilation, for cooling, or for suction, because holes are ordinarily formed on the surface of the roller, there is the problem that processing costs for carrying this out are high. To address this, Patent Reference No. 6 discloses a suction roller in which there is a roller produced by winding a fibril-like material about the surface of a cylindrical body on which a multiplicity of slits have been formed, and screen, nonwoven fabric, woven fabric, or paper comprising synthetic fiber or natural fiber, or a porous substance comprising plastic and/or metal which covers and engages with the outside surface of the cylindrical body. However, where a covering comprising ordinary woven fabric covers and engages with a cylindrical body, with conventional mesh-like woven fabric having air permeability, being nothing more than the intersections of warp yarn and weft yarn, there is a tendency for occurrence of fraying due to breakage of yarn and of runs in the material as a result thereof, and there is moreover a need to carry out prevention of fraying at the open ends of the cylindrical covering. In addition, with a roller covered with ordinary knit fabric or woven fabric, because no antislip function is carried out to prevent sliding relative to an object when the roller is rotating, it is necessary to secure this with adhesive or the like at location(s) where it contacts the core. Furthermore, in the context of a suction roller for carrying out suction, to carry out conveyance without damaging the surface of a sheet, suction holes are provided at the surface of the suction roller by means of the method in which holes are formed at the surface by etching and the fraying prevention method described above (see, for example, Patent Reference No. 7). Thus, with suction rollers, i.e., rollers which utilize suction, problems include damage to the surface of the sheet, positional dislocation during travel due to conveyance, offset defects, and the like, as a result of which fabrication of micropores, damage to the roller surface, burrs, and so forth are problems. These have therefore also been a factor in increasing cost as attempts have been made to improve the foregoing.

Moreover, with conventional ordinary rubber rollers which are rollers such as may be employed for conveyance or feeding of paper and the like, rubber rollers made up of rubber layer(s) at the surface thereof have such problems as the fact that gripping characteristics with respect to paper deteriorate due to contamination at the surface as a result of paper dust or the like and wear of the surface, and the fact that there will be misfeeds and so forth in accompaniment to this deterioration in gripping characteristics. This being the case, in order to deal with this, a construction has been adopted in which recesses and projections are provided at the surface of the rubber roller, and/or improvements have been made to the rubber material. Moreover, because the rubber roller surface is solid, there has been the problem that it has been impossible to avoid contamination due to accumulation of dust at the rubber surface, some apparatuses even being provided with a member which carries out cleaning of the roller surface. Conventional rollers thus include a wide variety of rollers, and roller mechanisms compatible with applications are known. In addition, various apparatuses for which conservation of resources, conservation of energy, recycling, and low cost are desired, as well as rollers and roller mechanisms for use with such apparatuses, have become necessary in recent years.

PRIOR ART REFERENCES

Patent References

Patent Reference No. 1: Japanese Patent Application Publication Kokai No. H3[1991]-71848
Patent Reference No. 2: Japanese Patent Application Publication Kokai No. H10[1998]-204779
Patent Reference No. 3: Japanese Utility Model Application Publication Kokai No. S62[1987]-100956
Patent Reference No. 4: Japanese Utility Model Application Publication Kokai No. H5[1993]-45034
Patent Reference No. 5: Japanese Patent Application Publication Kokai No. 2007-254141
Patent Reference No. 6: Japanese Patent Application Publication Kokai No. H8[2006]-239146
Patent Reference No. 7: Japanese Patent Application Publication Kokai No. H9[1997]-67053
Patent Reference No. 8: Japanese Patent Application Publication Kokai No. H8[1996]-53251

SUMMARY OF INVENTION

Problem to be Solved by Invention

A problem to be solved by the present invention is to eliminate the various problems with the rollers which are rotating support bodies employed in the foregoing conventional apparatuses as well as apparatuses that use those rollers, and to provide rollers comprising knit fabrics for use in a variety of apparatuses which achieve conservation of resources, conservation of energy, low cost, and recycling as well as roller mechanisms that employ such rollers.

Means for Solving Problem

Of the means in accordance with the present invention for solving the foregoing problems, in the context of a roller formed such that a surface of a rotating support body that supports a covering comprising knit fabric is covered thereby, a first means is such that this roller is a roller that conveys a sheet-like object or a three-dimensional object, a roller that supplies a sheet-like object or a three-dimensional object, a roller that moves in idler fashion in accompaniment to movement of a sheet-like object or a three-dimensional object, a roller that uses air to carry out cooling or drying while moving a sheet-like object or a three-dimensional object, or a roller that rotates while subjecting a sheet-like object or a three-dimensional object to suction. The knit fabric that covers the surface of the roller comprising such rotating support body has gaps possessing air permeability comprising loops of yarn; the knit fabric further has steps comprising stripes in a pattern of bands in a knit textile at a front surface or a back surface thereof, and has the stripes in the pattern of bands produced by these steps. The knit fabric is supported by the surface of the rotating support body so as to be arranged such that the stripes in the pattern of bands at this knit fabric are inclined in roughly perpendicular fashion with respect to a rotational direction. This knit fabric has small loop regions and large loop regions at which loops of different size and shape are mutually adjacent in a gauge direction constituting the rotational direction Loops at these large loop regions are constituted so as to have little slack as a result of plastic deformation of the yarn; loops in the small loop regions adjacent to the large loop regions are constituted in continuous fashion to contain entangled regions of the yarn in a stitch direction constituting an axial direction. It is a roller having a surface comprising knit fabric characterized in that this knit fabric comprises two domains, these being a domain at the large loop regions comprising the constitution having little slack in the yarn and a domain at the small loop regions containing the entangled regions of the yarn; the steps comprising the knit textile being present between the small loop regions and the large loop regions; the large loops comprising the constitution having little slack being formed in continuous fashion in the axial direction at a pitch of the small loops at the steps; the knit fabric is formed such that it comprises the pattern of bands produced by serial arrangement of the domains of the small loops in the axial direction and by serial arrangement of the domains of the large loops with little slack in the yarn in the rotational direction; and this knit fabric is provided as the covering at the surface of the rotating support body.

A second means is a roller having a surface comprising knit fabric according to the first means characterized in that the knit fabric having the stripes in the pattern of bands produced by the steps has end fraying prevention means by which prevention of fraying of an end of the yarn is carried out at the knit fabric or at the surface of the roller comprising the rotating support body that supports the knit fabric; and the roller comprising this rotating support body has means for preventing the covering comprising the knit fabric from being dislocated in the axial direction and in the rotational direction from the rotating support body by which it is supported due to rubbing and compression when the roller is rotating.

A third means is a roller having a surface comprising knit fabric according to the second means characterized in that the end fraying prevention means by which prevention of fraying of the end of the yarn is carried out at the knit fabric or at the surface of the roller is fraying prevention making use of slack at plastic deformation of the yarn, fraying prevention making use of compressive contact of the end by an antirotation member, fraying prevention making use of impregnation of the yarn by a coating agent or impregnation of the yarn by a low-viscosity adhesive, or fraying prevention making use of thermal fusing of low-melting-point hot-melt yarn included within the yarn; and the means for preventing the covering comprising the knit fabric from being dislocated in the axial direction and in the rotational direction from the rotating support body by which it is supported due to rubbing and compression when the roller is rotating is dislocation prevention making use of at least one among dislocation prevention making use of a gripping force comprising a force of tightening or a force of stretching of the knit fabric and friction between the covering and the rotating support member that supports the covering, dislocation prevention making use of engagement between recesses and projections of the knit fabric, dislocation prevention making use of engagement between protrusion-like regions or hook-like regions on the rotating support member and gaps in mesh at the knit fabric constituting the covering, prevention of dislocation between the covering and the rotating support body in which a force of tightening due to tension produced by stretchability of the knit fabric which is made to contain elastic fiber having stretchability and high coefficient of friction at the yarn which is made to comprise a plurality of filaments employed in the covering comprising the knit fabric and a gripping force produced by friction between this elastic fiber and the rotating support body are obtained, covering dislocation prevention in which the surface of the rotating support body is covered by an elastic body having a coefficient of friction higher than a coefficient of friction of the knit fabric and making use of a force of tightening produced by tension between the elastic body and the rotating support body covered thereby, and bonding making use of thermal fusing or bonding making use of pressure-sensitive adhesive or non-pressure-sensitive adhesive.

A fourth means is a roller having a surface comprising knit fabric according to any one of the first through third means characterized in that the covering comprising the knit fabric is such that a core yarn in the yarn employed at the knit fabric is yarn comprising monofilament, being yarn comprising filament which is such that flexural stress or heat causing the monofilament yarn to undergo plastic deformation at locations where this yarn filament mutually intersects and becomes entangled; or the yarn employed in the knit fabric is yarn comprising a plurality of filaments, this yarn including filament exhibiting plastic deformation as a result of exposure to a prescribed amount of heat, flexural stress and a prescribed amount of heat causing the yarn to undergo plastic deformation at locations where the yarn mutually intersects and becomes entangled, such that the entangled state is maintained; being knit fabric at which fraying of yarn is prevented; being a knit pattern in which pitch of stitch loops in the stitch direction constituting the axial direction is smaller than pitch of stitch loops in the gauge direction constituting the rotational direction of the roller; a state is maintained in which mutually contacting stitch loops are deformed and loop filament is entangled, as a result of which increased strength is present in the rotational direction due to mutual intertwining of filament and loop density in the axial direction; the knit fabric being such that fraying of the yarn at the covering in the context of rubbing or compression during rotation is prevented by plastic deformation of the filament; and the covering comprising this knit fabric being provided at the surface of the rotating support body which rotates.

A fifth means is a roller having a surface comprising knit fabric according to the third or fourth means characterized in that the yarn comprising a plurality of filaments is yarn forming the knit fabric constituting the covering that covers the surface of the roller; and the knit fabric is knit fabric selected from among knit fabric in the form of a plated-yarn-knit that is knit such that plated with monofilament at a core yarn is a stretchable elastic fiber having a coefficient of friction higher than a coefficient of friction of the core yarn, knit fabric that is knit using twisted yarn in which the yarn contains twisted therewithin stretchable elastic fiber of high coefficient of friction; and knit fabric that is knit using covered yarn in which the core yarn is monofilament and the covering yarn comprises a stretchable elastic fiber having a coefficient of friction higher than a coefficient of friction of the core yarn; such knit fabric being used as the covering at the surface of the roller.

A sixth means is a roller having a surface comprising knit fabric according to the fifth means characterized in that the knit fabric that is knit using twisted yarn containing twisted therewithin stretchable elastic fiber is such that the stretchable elastic fiber has a melting point which is lower than that of other filament; flexural stress and heat-setting during knitting cause the filament to undergo plastic deformation, and fusing of the low-melting-point stretchable elastic fiber causes the intersecting and entangled state to be stabilized, preventing fraying of the yarn; and this lain fabric is used as covering at the surface of the roller.

A seventh means is an apparatus employing a roller having a surface comprising knit fabric characterized in that a roller which is such that the surface of the roller that rotates is covered by the covering comprising the knit fabric according to any one means among the first means through the sixth means is employed as at least one means among object supply means, object conveyance means, object cooling means, or object suction means, or as drive means in at least one means thereamong.

Benefit of Invention

As a result of adoption of the foregoing means, the present invention, as a result of employment of a roller covered by a covering comprising knit fabric, makes it possible to form a roller and a conveyor apparatus employing such roller which permit conservation of resources, conservation of energy, low cost, and recyclability not obtainable conventionally.

EMBODIMENTS FOR CARRYING OUT INVENTION

Below, embodiments for carrying out the present invention are described with reference to the drawings. Roller 1 serving as rotating support body in accordance with the present invention comprises knit fabric 3a serving as covering 3 and rotating support body 2 therefor, covering 3 being constituted so as to be in a pattern of bands 4 and being constituted so as to have steps 6, the pattern of bands 4 being constituted so as to be approximately perpendicular to the direction of rotation of rotating support body 2.

Figure 1:
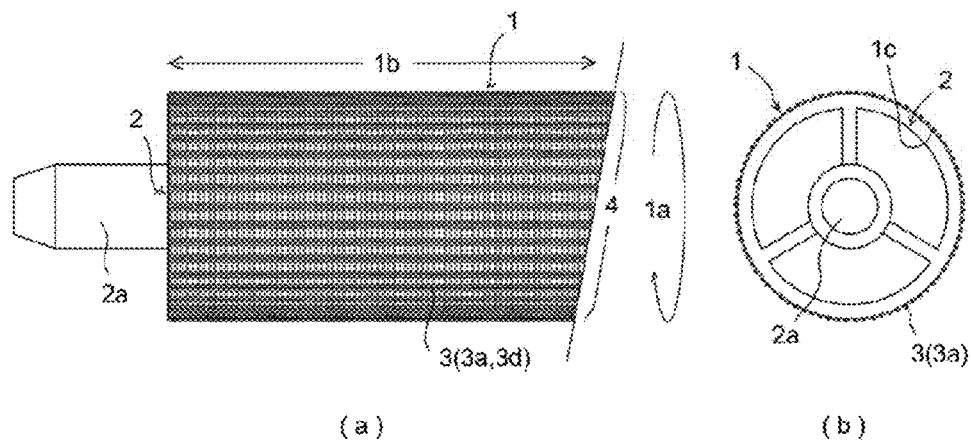
FIG. 1 Drawing of a roller covered in such fashion that projections produced by entangled regions of knit fabric are at the front surface, (a) being a front view, and (b) being a side view.

The constitution of a roller 1 in accordance with the present invention is shown in FIG. 1. This FIG. 1 is a drawing of a roller covered in such fashion that projections produced by entangled regions 3b of the knit fabric are at the front surface. FIG. 1 (*a*) is a front view of a roller 1 covered with a covering 3 comprising knit fabric 3a; FIG. 1 (*b*) is a side view of a roller 1 covered with a covering 3 comprising knit fabric 3a. These constitute a pattern of bands 4 produced by a knit pattern having large loops 4b and small loops 4c which are loops 4a at knit fabric 3a serving as covering 3 shown at (a) in FIG. 3; and as shown at FIG. 1, this knit fabric 3a covers rotating support body 2 in such fashion that projections 2c produced by entangled regions 3b of knit fabric 3a are at the front surface. As shown at (b) in FIG. 3, knit fabric 3a comprising such pattern of bands 4 has step 6 between the height of the knit pattern at the location of a large loop 4b and the height of the knit pattern at the location of a small loop 4c. Causing rotating support body 2 to be covered in such fashion that projections 2c produced by entangled regions 3b of knit fabric 3a in pattern of bands 4 having this step 6 are at the front surface as shown in FIG. 1 makes it possible to easily form many and diverse rollers 1.

Figure 2:
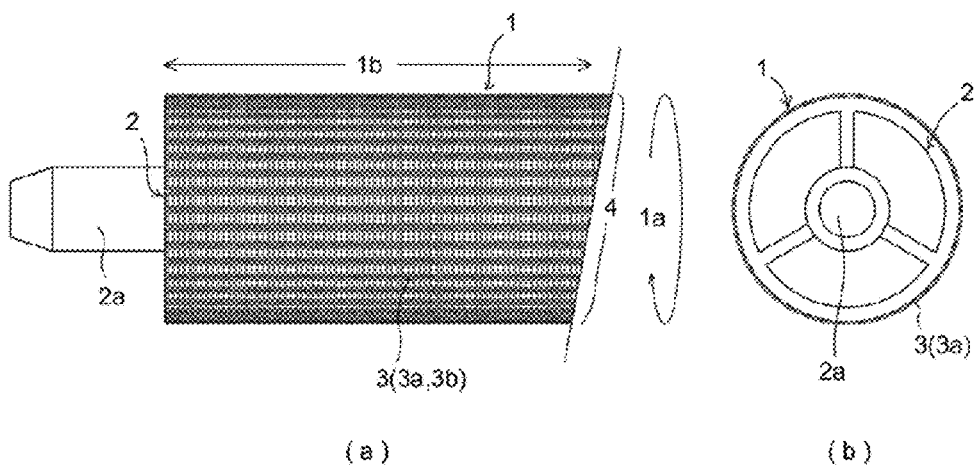
FIG. 2 Drawing of a roller covered in such fashion that projections produced by entangled regions of knit fabric are at the back surface, (a) being a front view, and (b) being a side view.

Moreover, another constitution of a roller 1 in accordance with the present invention is shown in FIG. 2. This FIG. 2 is a drawing of a roller covered in such fashion that projections 2c produced by entangled regions 3b of the Lift fabric are at the back surface. FIG. 2 (a) is a front view of a roller 1 covered with a covering 3 comprising kilt fabric 3a; FIG. 2 (b) is a side view of a roller 1 covered with a covering 3 comprising knit fabric 3a. These constitute a pattern of bands 4 produced by a knit pattern having large loops 4b and small loops 4c which are loops 4a at knit fabric 3a serving as covering 3 shown at (a) in FIG. 3; and as shown at FIG. 2, this knit fabric 3a covers rotating support body 2 in such fashion that projections 2c produced by entangled regions 3b of knit fabric 3a are at the back surface. As shown at (b) in FIG. 3, knit fabric 3a comprising such pattern of bands 4 has step 6 between the height of the knit pattern at the location of a large loop 4b and the height of the knit pattern at the location of a small loop 4c. Causing rotating support body 2 to be covered in such fashion that projections 2c produced by entangled regions 3b of knit fabric 3a in pattern of bands 4 having this step 6 are at the back surface as shown in FIG. 2 makes it possible to easily form many and diverse rollers 1.

For example, manufacture of a roller 1 having recesses and projections at the surface thereof might require that the scale of the facilities and the precision of the operations employed increase with increasing width of the roller 1, and that much time be required for fabrication thereof. However, with a roller 1 in accordance with the present invention, as the rotating support body 2 shown in FIG. 1 or FIG. 2 need only be covered by a knit fabric 3a shown in FIG. 3 that is a covering 3 in which the required step 6 is constituted in a pattern of bands 4 by large loops 4b and small loops 4c, this can easily be fabricated without regard to the magnitude of the width thereof. Furthermore, as shown at (a) in FIG. 1, where gripping is required at the front surface of roller 1, causing elastic fibers comprising urethane fibers to be included among the fibers at the front surface of knit fabric 3a serving as covering 3 will make it possible to easily obtain a front surface at roller 1 which is such that projections 2c produced by entangled regions 3b having gripping characteristics are at the front surface thereof. On the other hand, as shown at (a) in FIG. 2, where gripping is not required at the front surface of roller 1, causing covering 3 at which elastic fibers comprising urethane fibers or the like are included among the fibers at the front surface of knit fabric 3a to be turned inside-out and causing projections 2c produced by entangled regions 3b to be used as the back surface will make it possible to easily obtain a front surface at roller 1 which does not have gripping characteristics.

Figure 21:
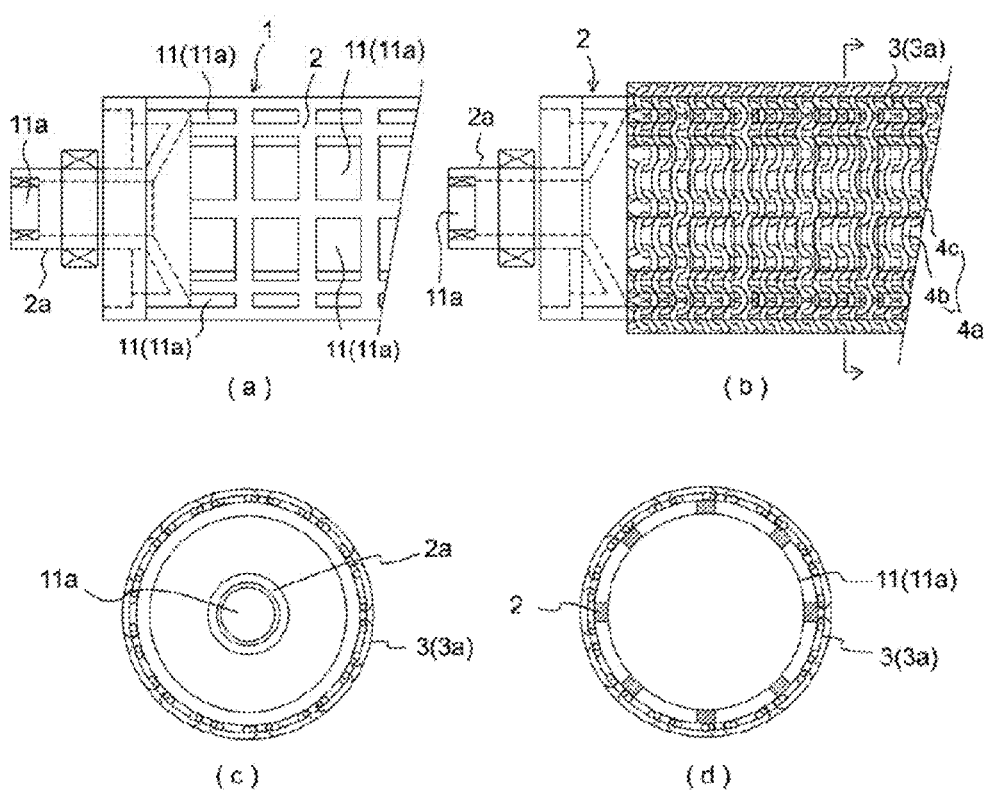
FIG. 21 Drawing in which air suction holes or air injection holes are provided at a core serving as rotating support body for a covering, (a) being a sectional view of a rotating support body having a covering, (b) being a side view of a rotating support body having a covering, (c) being a front view of a rotating support body having a covering, and (d) being a front view of a rotating support body having holes.

Moreover, as shown in FIG. 21 which is described below, at a roller 1 which is a suction roller in which the core that makes up rotating support body 2 which supports covering 3 has hole(s) 11, even where there is poor precision in the hole(s) 11 for air suction or air expulsion, it will be possible to obtain the required air permeability by adjusting air permeability by means of the density of loops 4a in the form of large loops 4b and small loops 4c which are formed between stitches at knit fabric 3a.

Roller 1 in accordance with the present invention is thus a roller 1 formed by covering with a covering 3 in the form of a knit fabric 3a that did not exist conventionally, and being capable of accommodating a various types of rollers, this roller 1 may be used to fabricate various types of apparatuses.

Figure 3:
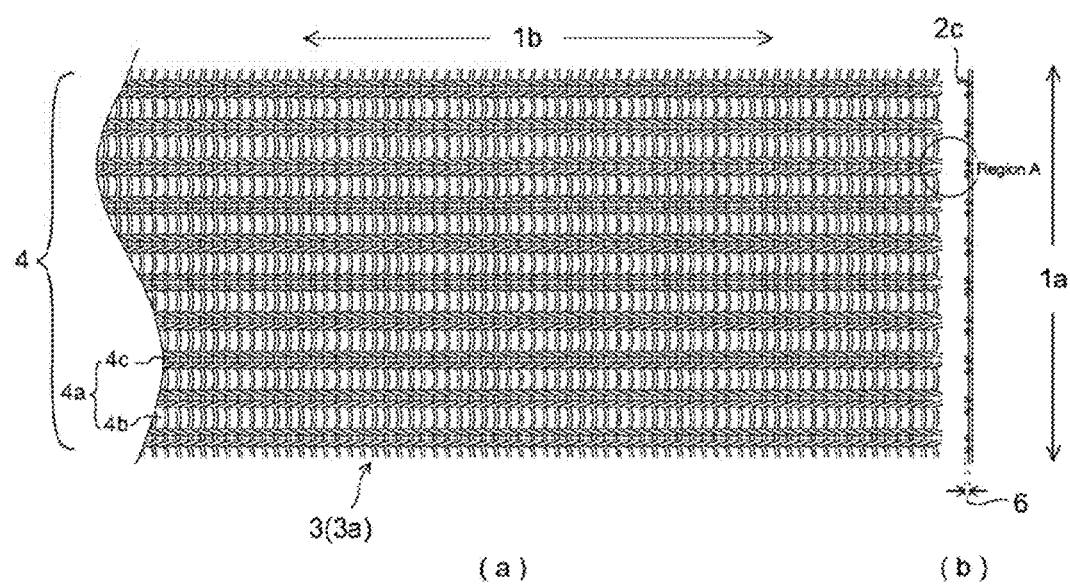
FIG. 3 Drawing showing knit fabric constituted in a pattern of bands from small loop regions and large loop regions, (a) being a plan view, and (b) being a side view.
Figure 4:
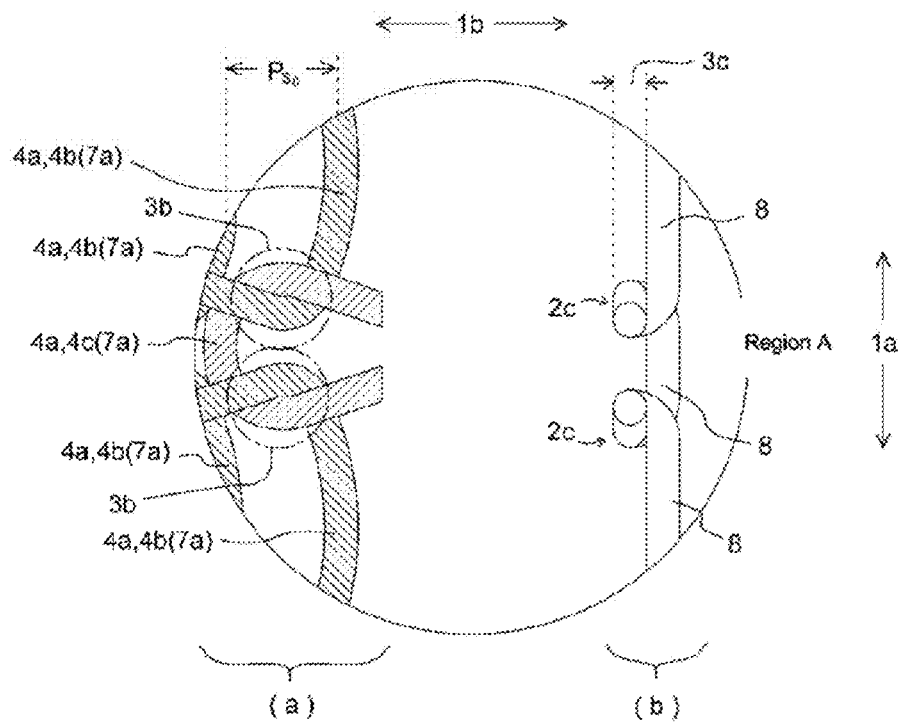
FIG. 4 Drawing showing further enlarged view of encircled region A indicated at upper right in FIG. 3.

FIG. 4 shows an enlarged view of region A indicated by the circle at FIG. 3. As shown at FIG. 4, the pattern of bands 4 in knit fabric 3a at FIG. 3 is constituted from yarn 8 in the form of small loops 4c, which are short loops between adjacent pairs of entangled regions 3b, and large loops 4b, which are long loops between substantially separated entangled regions 3b. Moreover, the steps 6 shown at (b) in FIG. 3 are constituted between these small loops 4c and large loops 4b. As shown at the right side in FIG. 4, one means for increasing size of this step 6 in knit fabric 3a would be to increase diameter 3c of yarn 8.

Figure 5:
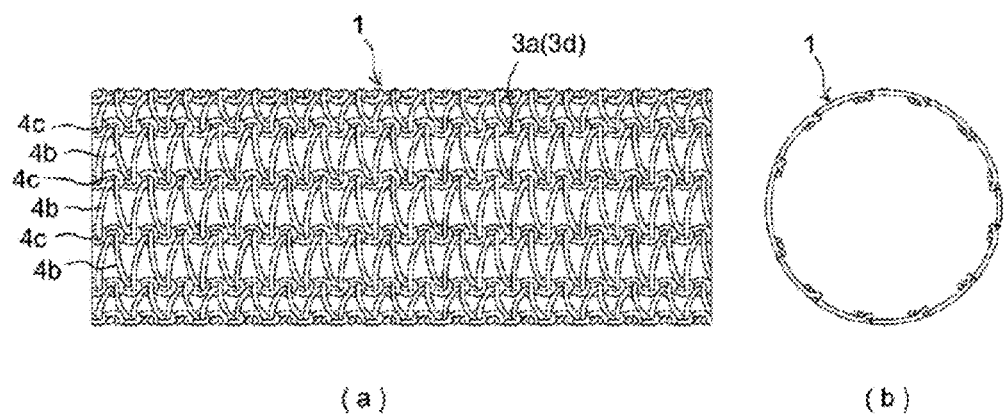
FIG. 5 Drawing of cylindrical knit comprising single-tricot warp-knit, (a) being a front view, and (b) being a side view.
Figure 6:
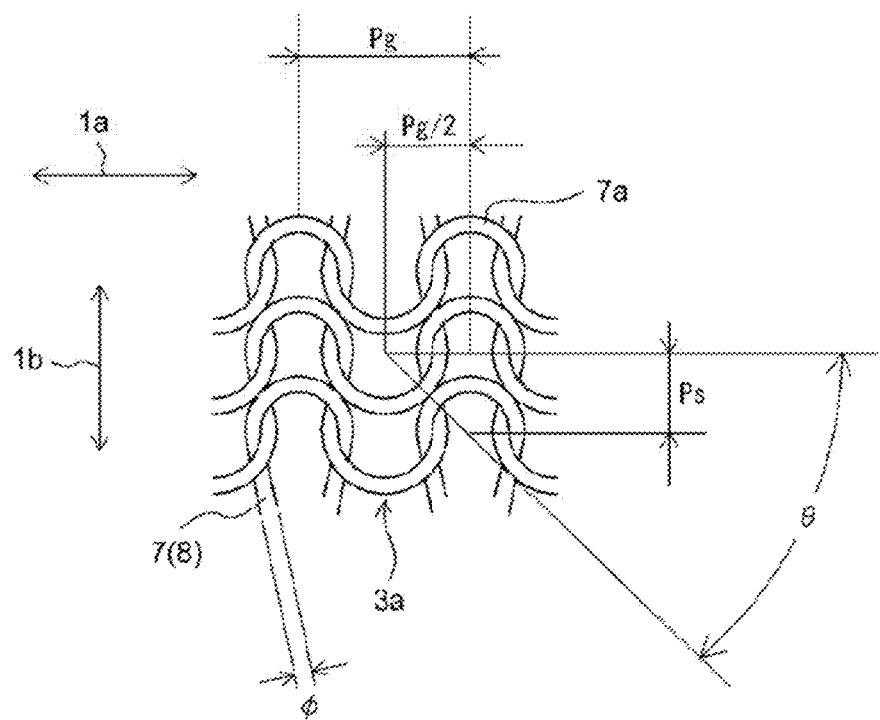
FIG. 6 Drawing showing conditions affecting stitches at knit fabric.

Knit fabric 3a constituted as described above, which may take the form of sheet-like knit fabric 3a shown in FIG. 3 or the cylindrical knit fabric 3a shown in FIG. 5, is used as covering 3 to cover rotating support body 2 as shown in FIG. 1 or FIG. 2 to produce the roller 1 shown in FIG. 1 or FIG. 2. Further describing this knit fabric 3a serving as covering 3 in FIG. 1 or FIG. 2, this knit fabric 3a is an example comprising warp-knit cylindrical knit 3d which comprises single-tricot. As shown in FIG. 1, FIG. 2, and FIG. 6, at covering 3 comprising this knit fabric 3a, FORMULA (1) governing the relationship among pitch Pg in the gauge direction, i.e., rotational direction 1a, of loops 4a in knit fabric 3a in the direction of rotation (gauge direction, i.e., conveying direction) 1a of roller 1; pitch Ps in the stitch direction of loops 4a in knit fabric 3a in the stitch direction, i.e., axial direction 1b, of roller 1; and filament diameter Φ of fiber(s) 7 of yarn 8 has been discovered in the context of knit fabric 3a shown in FIG. 6. This FORMULA 1 is indicated below.

FORMULA 1 may be expressed as follows.

$$(Ps)^2+(Pg/2)^2=\{(Pg/2)+2\Phi\}^2 \tag{1}$$

. . . which can be rewritten as . . .

$$(Ps)^2=2\Phi \cdot Pg+4\Phi^2 \tag{1}$$

At FORMULA (1) and FIG. 6, note that:

Ps indicates pitch in the stitch direction, $Ps_0$ indicates pitch when neighboring loops are in mutual contact but deformation of loops does not occur, $Ps_1$ indicates pitch when neighboring loops are in mutual contact and deformation of loops does occur, Pg indicates pitch in the gauge direction, Φ indicates filament diameter, and θ indicates angle.

As shown in FIG. 4, at this knit fabric 3a, expressing the pitch of loops 4a in the stitch direction, i.e., axial direction 1b, when loops 4a of adjacent stitches making up pattern of bands 4 are in mutual contact but deformation of loops 4a does not occur as $Ps_0$, and expressing the pitch of loops 4a in the stitch direction, i.e., axial direction 1b, when loops 4a are in mutual contact and deformation of loops 4a does occur as $Ps_1$, the constitution is such that knitting is carried out so as to cause pitch Ps in the stitch direction which is axial direction 1b to be pitch $Ps_1$ at which deformation of loops 4a does occur so that $Ps_0 > Ps_1$, and the constitution is such that, at locations of entangled regions 3b where there is intertwining of filament 7a, flexural stress becomes severe in accompaniment to deformation of loops 4a at locations of entangled regions 3b where there is intertwining of filament 7a, causing filament 7a to undergo plastic deformation, such that fraying of yarn 8 is prevented. Moreover, at knit fabric 3a as shown in FIG. 6, reducing pitch Ps in the stitch direction which is the axial direction 1b of roller 1 will cause increase in density per unit width in the stitch direction which is the axial direction 1b, and will improve strength in the rotational direction 1a shown in FIG. 1 or FIG. 2. In addition, by thus making $Ps_0 > Ps_1$, it is possible to cause deformation of stitch loops 4a. Moreover, by employing a constitution in which knit fabric 3a is made to have two different loop configurations, it is possible to achieve a constitution in which knit fabric 3a comprises a pattern of bands 4. One of these two different loop configurations is the region at small loop 4c which has entangled regions 3b indicated by the circle drawn in alternating long and short chain line at FIG. 4 and which has thickness due to entangled regions 3b, and the other is constituted by the region at large loop 4b comprising the thickness of yarn 8 which is the portion of loop 4a that has slack, i.e., curvature 5, and that is adjacent to the region at small loop 4c in the gauge direction, i.e., rotational direction 1a, shown in FIG. 4. At this knit fabric 3a, knitting conditions or heat-setting may be employed to cause reduction in curvature 5 at the foregoing large loops 4b, decreasing elongation of loops 4a under low tension in domains within which tension acts such that there is curvature 5 thereat, to achieve a constitution in which domains permitting tension to be obtained are such that tension can be obtained even with little percent elongation. In addition, covering 3 comprising knit fabric 3a having this tension, i.e., force of tightening, is installed at the surface 1c of the rotating roller which is rotating support body 2 to obtain roller 1.

Figure 7:
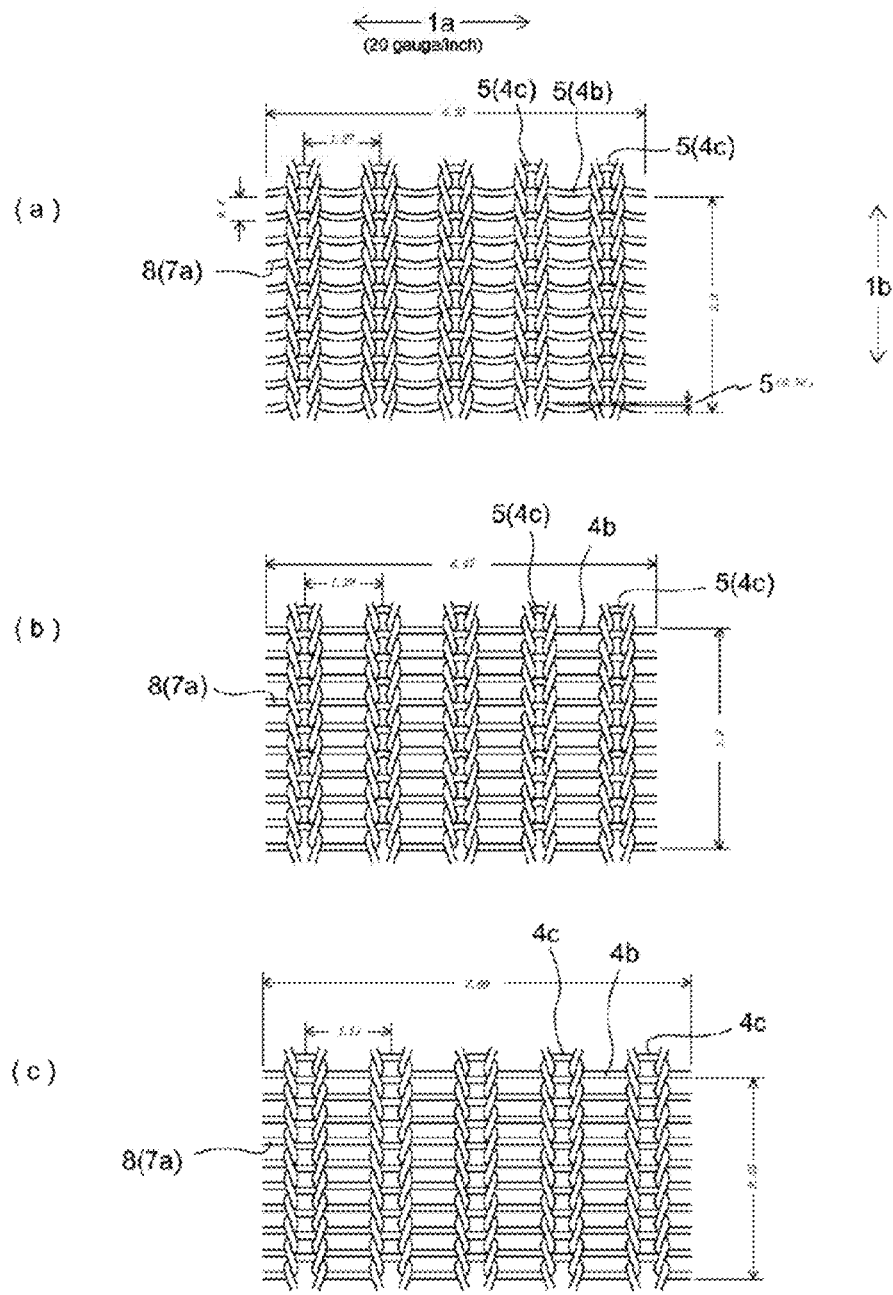
FIG. 7 Diagrams of three knit fabrics in which the magnitude of the spacing between mutually adjacent large loops in the gauge direction of the covering comprising knit fabric in accordance with the present invention is different, the magnitude of the spacing between large loops being small at (a), medium at (b), and large at (c).

Moreover, FIG. 7 shows an example of a situation that might be obtained when covering 3 employed at roller 1 in accordance with the present invention is stretched in the rotational direction 1a. As shown in FIG. 7, filament 7a constituting yarn 8 is made to undergo plastic deformation, causing deformation of loops 4a that come in mutual contact, and reducing slack, i.e., curvature 5, of yarn 8 in the gauge direction, which is the direction of rotation 1a of roller 1. That is, at (a) in FIG. 7, because loops 4a comprising large loops 4b and small loops 4c are unstretched, length in the rotational direction 1a is at a maximum, and there is occurrence of some amount of curvature 5, i.e., some amount of looping, in loops 4a comprising large loops 4b and small loops 4c. At (b) in FIG. 7, in low-tension domains within which tension acts such that there is low tension in the rotational direction 1a, only large loops 4b are stretched such that there is no curvature 5 thereat, while at small loops 4c there is curvature 5 because these are unstretched.

Moreover, at (c) in FIG. 7, in medium-tension domains or high-tension domains within which tension acts such that there is more or less medium tension or high tension in the rotational direction 1a, because at (b) it was the case that only large loops 4b were already stretched as has been described, what happens at this (c) is that only curvature 5 of loops 4c undergoes deformation as a result of stretching, causing length to become a minimum, and a state is achieved such that there is no elongation in domains within which tension can be obtained from knit fibric 3a, as a result of which there is reduction in the change in the axial direction 1b. At FIG. 7, note that values indicating lengths are in units of (20 gauge/1 inch).

Figure 8:
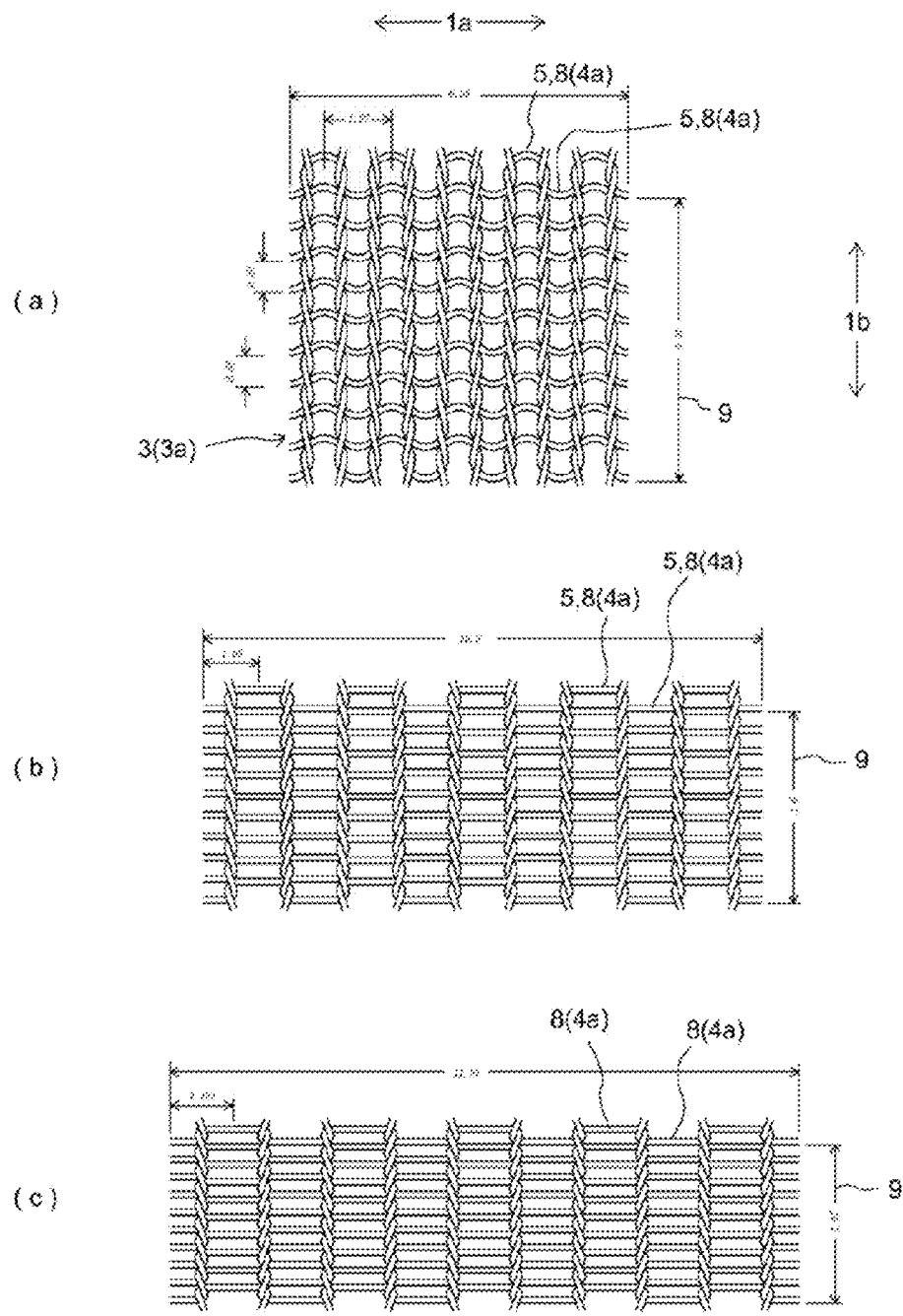
FIG. 8 Diagrams of three knit fabrics in which the magnitude of the spacing between mutually adjacent large loops in the gauge direction of the covering comprising conventional knit fabric is the same, the magnitude of the spacing between large loops being small at (a), medium at (b), and large at (c).

On the other hand. FIG. 8 shows an example of a situation that might be obtained when a conventional knit fabric 3a serving as covering 3 is stretched in rotational direction 1a. As shown in this FIG. 8, a conventional loin fabric 3a serving as covering 3 employed at roller 1 might typically employ multifilament yarn 8 comprising a multiplicity of filaments 7a as yarn 8. Accordingly, as indicated at (a) in FIG. 8, as multifilament yarn 8 comprising multiplicity of filaments 7a undergoes plastic deformation only with difficulty, curvature 5 of loops 4a is large. Accordingly, as indicated at (b) in FIG. 8, several tens of percent of elongation is necessary to eliminate curvature 5 at loops 4a; and throughout the period until curvature 5 at loops 4a is eliminated, knit fabric 3a is in a low-tension domain, within which tension is low. Moreover, at (c) in FIG. 8, in high-tension domains within which knit fabric 3a is stretched under high tension in the gauge direction, i.e., rotational direction 1a, in contradistinction to the elongation that exists in the gauge direction, i.e., rotational direction 1a, there is a decrease in the lateral width 9 in the axial direction 1b of knit fabric 3a, creating a situation which is such that, unless something is done to alter the situation, use of roller 1 as covering 3 would be difficult from the standpoints of stretchability and tension. At FIG. 8, note that values indicating lengths are in units of (20 gauge/1 inch).

Moreover, as covering 3 employed at roller 1 in accordance with the present invention is made up of large loops 4b and small loops 4c, if filament 7a comprising artificial fiber is employed as yarn 8 and steam is used to carry out heat-setting while large loops 4b are held under tension during operations for manufacture of covering 3, this will stabilize the dimensions of large loops 4b and will reduce curvature 5, i.e., slack, at large loops 4b. This will make it possible to obtain tension in domains within which percent elongation is low. Furthermore, with respect to the axial direction 1b of roller 1. i.e., the stitch direction, as well, by causing small loops 4c to be constituted in continuous fashion and of such size that they tend not to deform in the axial direction 1b, i.e., width direction, by operating so as to impede shrinkage in the axial direction 1b, measures are employed to address change in the width direction, i.e., axial direction 1b, as well.

In contradistinction hereto, as shown in the aforementioned FIG. 8, in a covering 3 comprising conventional knit fabric 3a, loops 4a all have the same dimensions; and with a knit fabric 3a constituted so as to have gaps, the situation is such that usage is difficult, since any elongation in the gauge direction, i.e., rotational direction 1a, tends to cause shrinkage in the axial direction 1b, i.e., width direction.

Covering 3 comprising knit fabric 3a employed in the present invention is constituted so as to have regions in which there are large loops 4b and regions in which there are small loops 4c having entangled regions 3b, being knit fabric 3a constituted so as to have pattern of bands 4 shown at (a) in FIG. 3 and step 6 shown at (b) in FIG. 3 as a result of presence of these two types of regions. At this knit fabric 3a, by decreasing the size of loops 4a at small loops 4c and by reducing curvature 5, i.e., slack, at large loops 4b, it is possible to reduce shrinkage in axial direction 1b and elongation associated with curvature 5. Moreover, by reducing curvature 5, i.e., slack, at large loops 4b, it is possible to obtain required tension even at low percent elongation, and in addition, covering 3 is a knit fabric 3a constituted so as to permit reduced change in the axial direction 1b, this covering 3 in which knit fabric 3a has been made to be of cylindrical configuration or in which knit fabric 3a has been made to be of sheet-like configuration being made to cover rotating support body 2 to produce roller 1. Note that such a constitution may be formed from knit fabric 3a that is either weft-knit or warp-knit.

Figure 9:
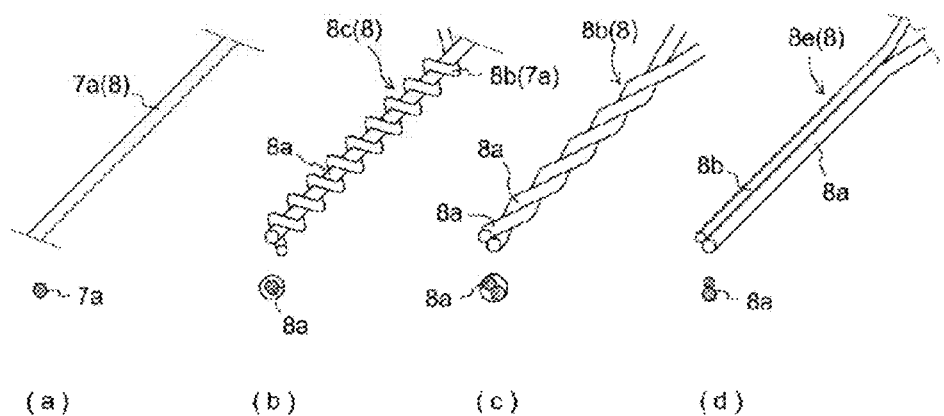
FIG. 9 Perspective views and sectional views showing yarn of unmodified cross-section and of ordinary shape employed in coverings, single-ply yarn being shown in the diagrams at (a), covered yarn being shown in the diagrams at (b), twisted yarn being shown in the diagrams at (c), and plated yarn being shown in the diagrams at (d).
Figure 10:
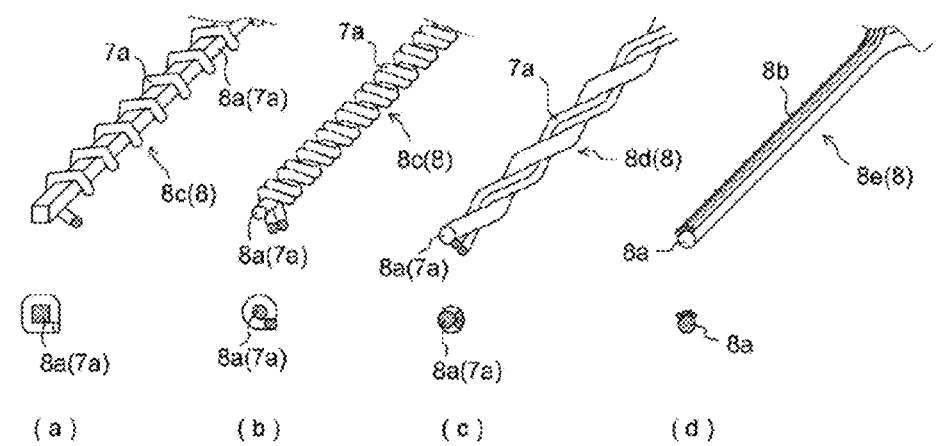
FIG. 10 Perspective views and sectional views of yarn of modified cross-section employed in coverings, the diagrams at (a) showing single-ply yarn, the diagrams at (b) showing covered yarn, the diagrams at (c) showing twisted yarn, and the diagrams at (d) showing plated yarn.

Next, exemplary yarns 8 which may be used for knitting of knit fabric 3a serving as covering 3 are described based on the schematic perspective views of yarn configurations and the sectional views therebelow at FIG. 9 and FIG. 10. First, (a) at FIG. 9 is monofilament single-ply yarn in which filament 7a is of unmodified cross-section, which is to say that it is circular; (b) at FIG. 9 is covered yarn 8c in which elastic fiber 8b covers monofilament serving as core yarn 8a; (c) at FIG. 9 is twisted yarn 8d formed by twisting core yarn 8a together with core yarn 8a having different characteristics; and (d) at FIG. 9 is plated yarn 8e in which monofilament core yarn 8a is plated with one strand of elastic fiber 8b which is a different type of monofilament having small diameter. Next, (a) at FIG. 10 is covered yarn 8c of modified cross-section in which monofilament covering yarn is wound about and covers core yarn 8a of modified cross-section; (b) at FIG. 10 is covered yarn 8c of modified cross-section in which covering yarn comprising two strands of modified cross-section is wound about and covers monofilament core yarn 8a of unmodified cross-section; (c) at FIG. 10 is twisted yarn 8d of modified cross-section formed by twisting monofilament core yarn 8a of unmodified cross-section together with yarn of modified cross-section comprising two strands: and (d) at FIG. 10 is plated yarn 8e of modified cross-section formed by plating monofilament core yarn 8a of unmodified cross-section with four strands of yarn which are thinner than core yarn 8a.

Knit fabric 3a comprising yarn 8 of modified cross-section as shown in FIG. 10 permits increase in the area over which contact is made with rotating support body 2 used as roller 1 for moving or conveying and between such knit fabric 3a serving as covering 3 and a conveyed object. Accordingly, where gripping characteristics are required at surface(s) of knit fabric 3a, it will be effective to employ knit fabric 3a made from yarn 8 of modified cross-section. Thus, as yarn 8 having characteristics different from core yarn 8a, by using covered yarn 8c in which filament 7a of different coefficient of friction and/or melting point covers core yarn 8a comprising artificial-fiber monofilament of modified cross-section as at (a) or (b) in the aforementioned FIG. 10, twisted yarn 8d of modified cross-section formed by twisting two-ply yarn together with core yarn 8a comprising artificial-fiber monofilament as at (c) in FIG. 10, and/or plated yarn 8e of modified cross-section formed by plating four strands of thin yarn with core yarn 8a comprising artificial-fiber monofilament as at (d) in FIG. 10, to produce knit fabric 3a, it will be possible to obtain gripping characteristics, heat-resistance, wear-resistance, and/or other such required characteristics. If Lift fabric 3a made up of plated yarn 8e (hereinafter "plated-yarn-knit") in which, as shown at (d) in FIG. 10, core yarn 8a is plated with elastic fiber 8b is used as such knit fabric 3a, this will make it possible to easily obtain a plated-yarn-knit having different characteristics at the front and back sides thereof.

Figure 11:
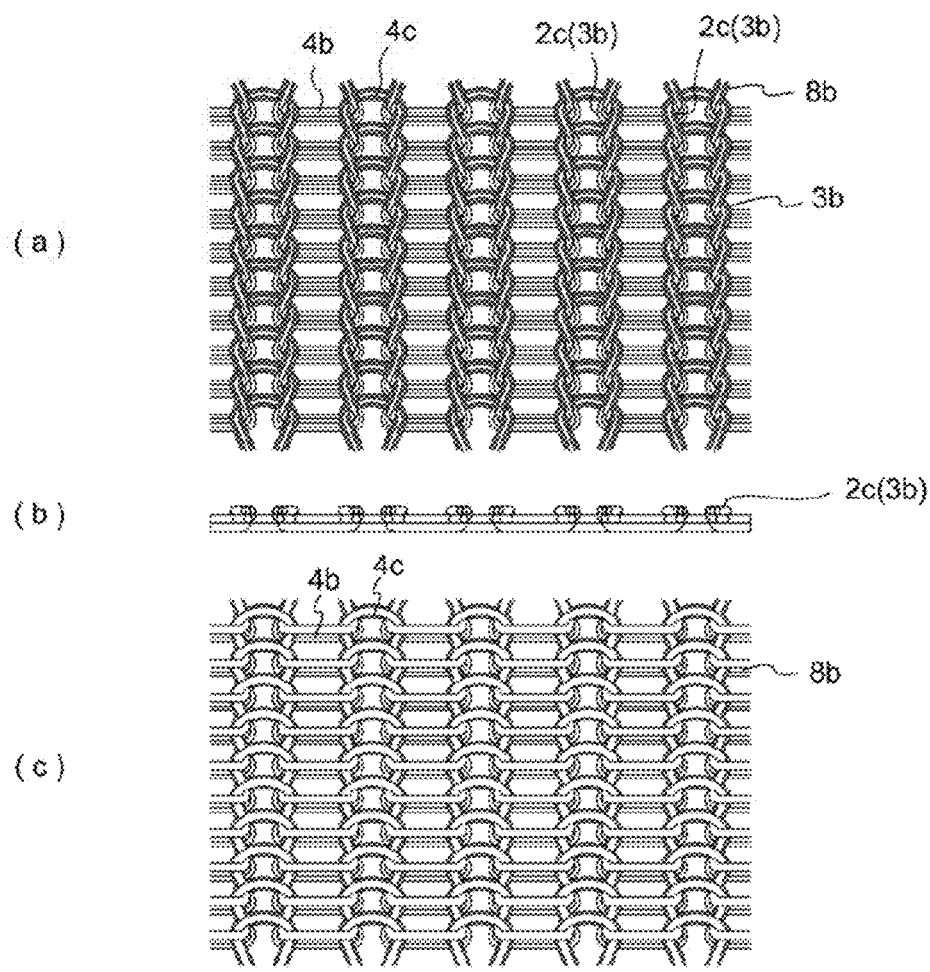
FIG. 11 Plated-yarn-knit in which elastic fiber is at the front surface and projections are at the front surface, (a) being a plan view as seen from the front, (b) being a side view, (c) being a plan view as seen from the back.

Examples of such plated-yarn-knits having different characteristics at front and back sides thereof will be described based on FIG. 11, FIG. 12, FIG. 13, and FIG. 14. FIG. 11 shows Example 1 of a plated-yarn-knit which is a knit fabric 3a knit from yarn 8 comprising plated yarn 8e in which elastic fiber 8b is used to plate core yarn 8a as shown in FIG. 9 and FIG. 10; (a) at FIG. 11 being a front view, the side at which that elastic fiber 8b is present being taken to be the front side thereof, this example being such that projections 2c comprising entangled regions 3b of small loops 4c and large loops 4b are at the front surface thereof; (b) being a side view of (a); and (c) being a back view of (a).

Figure 12:
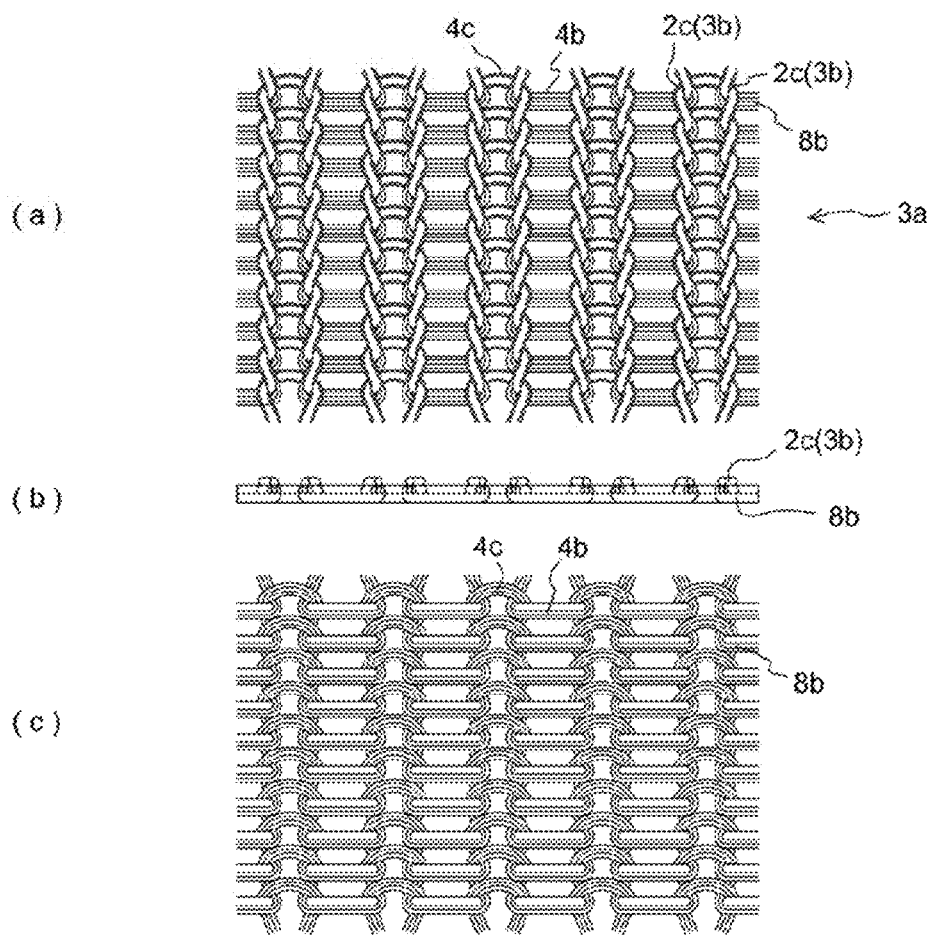
FIG. 12 Plated-yarn-knit in which elastic fiber is at the back surface and projections are at the front surface, (a) being a plan view as seen from the front, (b) being a side view, (c) being a plan view as seen from the back.

FIG. 12 is Example 2 of a plated-yarn-knit which is a knit fabric 3a knit from yarn 8 comprising plated yarn 8e in which elastic fiber 8b is used to plate core yarn 8a as shown in FIG. 9 and FIG. 10; (a) at FIG. 12 being a front view, the side at which elastic fiber 8b is present being taken to be the back side thereof, this example being such that projections 2c comprising entangled regions 3b of small loops 4c and large loops 4b are at the front surface thereof; (b) being a side view of (a); and (c) being a back view of (a).

Figure 13:
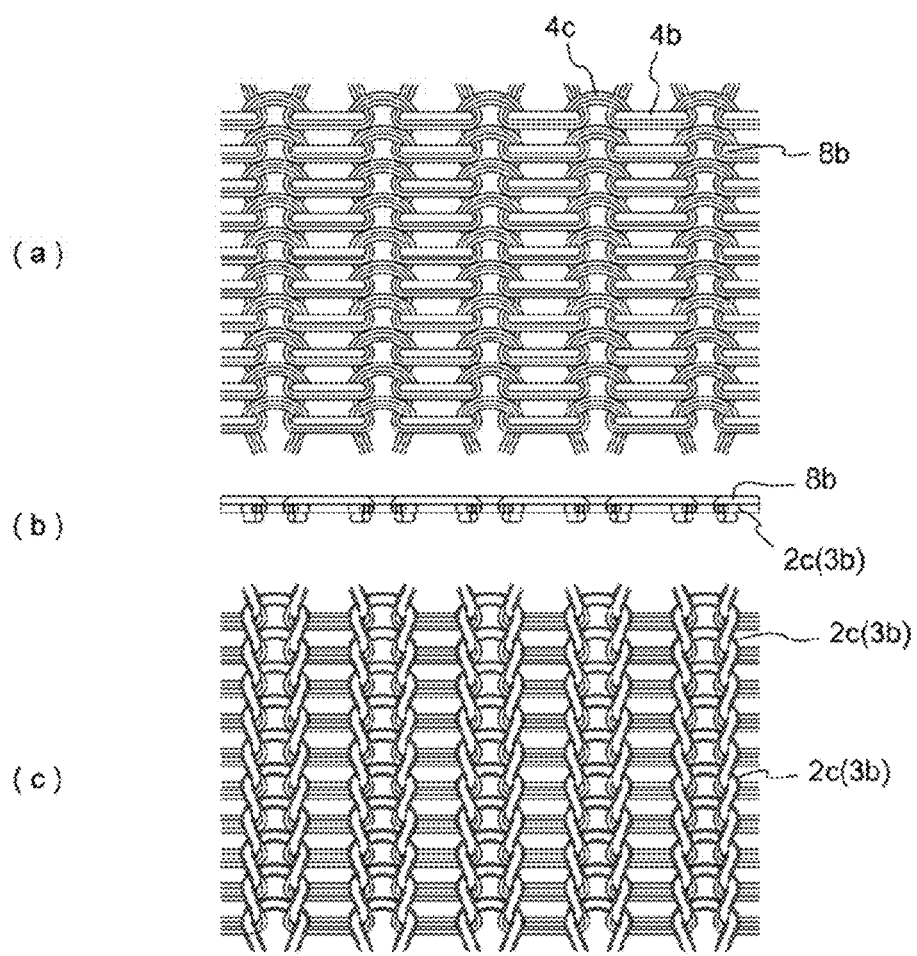
FIG. 13 Plated-yarn-knit in which elastic fiber is at the front surface and projections are at the back surface, (a) being a plan view as seen from the front, (b) being a side view, (c) being a plan view as seen from the back.

FIG. 13 is Example 3 of a plated-yarn-knit which is a knit fabric 3a knit from yarn 8 comprising plated yarn 8e in which elastic fiber 8b is used to plate core yarn 8a as shown in FIG. 9 and FIG. 10; (a) at FIG. 13 being a front view, the side at which elastic fiber 8b is present being taken to be the front side thereof, this example being such that projections 2c comprising entangled regions 3b of small loops 4c and large loops 4b are at the back surface thereof; (b) being a side view of (a); and (c) being a back view of (a), projections 2c being present at the back side.

Figure 14:
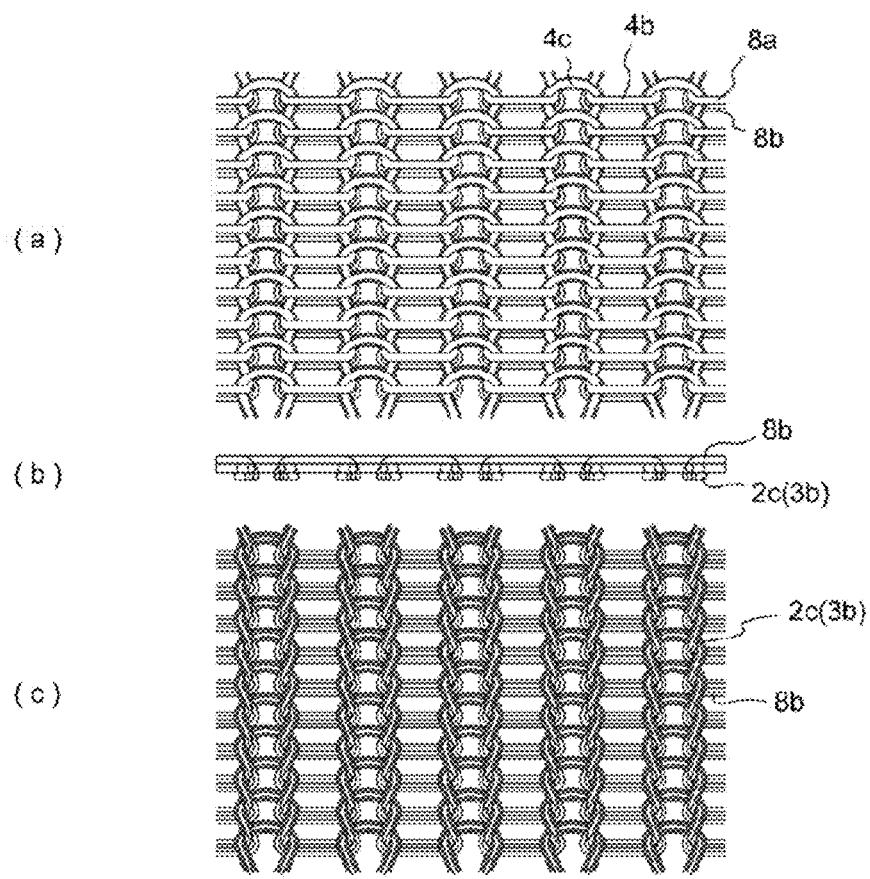
FIG. 14 Plated-yarn-knit in which elastic fiber is at the back surface and projections are at the back surface, (a) being a plan view as seen from the front, (b) being a side view, (c) being a plan view as seen from the back.

FIG. 14 is Example 4 of a plated-yarn-knit which is a knit fabric 3a knit from yarn 8 comprising plated yarn 8e in which elastic fiber 8b is used to plate core yarn 8a as shown in FIG. 9 and FIG. 10; (a) at FIG. 14 being a front view, the side at which elastic fiber 8b is present being taken to be the back side thereof, this example being such that projections 2c comprising entangled regions 3b of small loops 4c and large loops 4b are moreover at the back surface thereof; (b) being a side view of (a); and (c) being a back view of (a), projections 2c being present at the back side.

Furthermore, covered yarn 8c and/or twisted yarn 8d shown in FIG. 9 and FIG. 10 may be employed and may be made to have characteristics different from core yarn 8a so that the front and back sides of kilt fabric 3a may be imparted with required characteristics. Furthermore, thermally fusible filament 7a having melting point which is low and which is different from that of core yarn 8a may be employed and heat-setting may be carried out to permit achievement of a constitution in which even better prevention of fraying of filament 7a is possible. Note that examples of the aforementioned artificial fibers include polyester fiber, Nylon fiber, acrylic fiber, polypropylene fiber, polyethylene fiber, urethane fiber, metal fiber, carbon fibers, glass fiber, rayon fiber, and so forth, there being a great many varieties from which it is possible to select that or those which will be employed as appropriate depending on application.

As described above, covering 3 in the form of knit fabric 3a is such that means for providing knit fabric 3a serving as covering 3 with step(s) 6 shown in FIG. 3, and means for imparting grip characteristics and/or other such capabilities thereto, are constituted so as to permit adjustment based on how yarn 8 is used. Moreover, by varying material(s) at yarn 8, it is also possible to fabricate a wide variety of rollers 1 which may be imparted with heat resistance, weather resistance, and so forth. Note that depending on the application for which it will be employed, insulating fiber and/or electrically conductive fiber may be selected as appropriate for use at yarn 8 in knit fibric 3a serving as covering 3.

Figure 15:
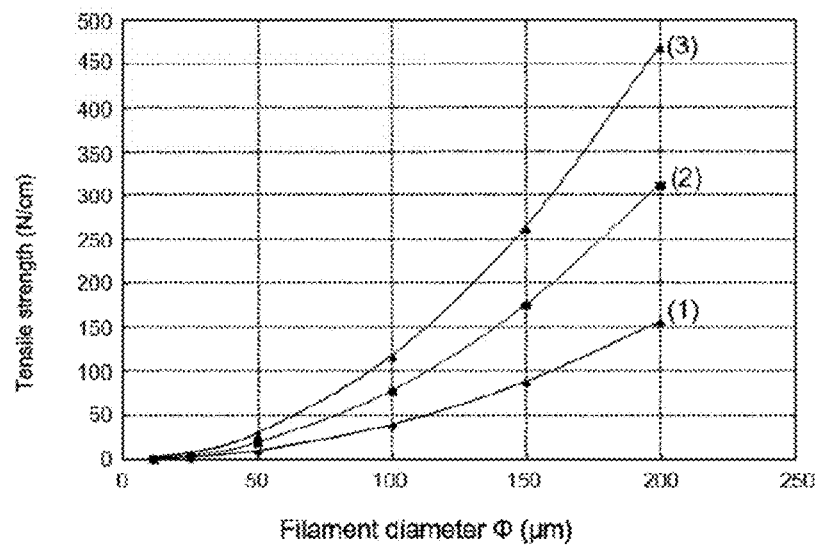
FIG. 15 Graph showing theoretical calculations of relationship between tensile strength and filament diameter of yarn comprising Nylon serving as material in a covering made of knit fabric for several different densities of Nylon filament in the axial direction.
Figure 16:
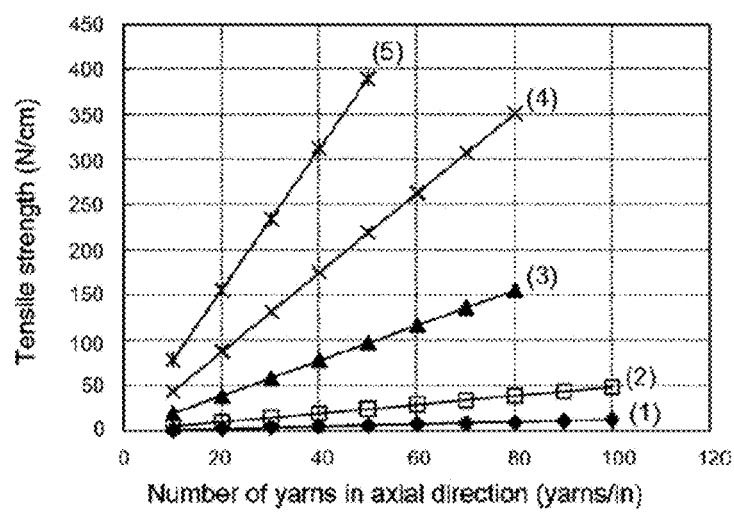
FIG. 16 Graph showing theoretical calculations, for several different yarn diameters, of relationship between tensile strength and number of yarns in the axial direction as a function of diameter of filament serving as material in a covering made of knit fabric.

Moreover, a graph of theoretical calculations for tensile strength of Nylon fiber when Nylon fiber is used in yarn 8 at knit fabric 3a is shown in FIG. 15. The graphed results show the relationship between filament diameter $\Phi(\mu m)$ and tensile strength (N/cm) where Nylon is employed as filament material, the relationship being shown for several different numbers of filaments per inch. In the graph, note that (1) indicates that there were 20 filaments per inch, (2) indicates that there were 40 filaments per inch, and (3) indicates that there were 60 filaments per inch. Moreover, the graph at FIG. 16 shows theoretical calculations for the relationship between tensile strength (N/cm) and number of yarns (yarns/inch) in the axial direction of the roller for various filament diameters ($\mu m$). In the graph at FIG. 16, note that (1) indicates a filament diameter of 199.3 $\mu m$, (2) indicates a filament diameter of 149.5 $\mu m$, (3) indicates a filament diameter of 99.6 $\mu m$, (4) indicates a filament diameter of 49.8 $\mu m$, and (5) indicates a filament diameter of 24.9 $\mu m$. Where Nylon filament is employed at yarn 8 in core yarn 8a, based on the graph at FIG. 15 a filament diameter $\Phi$ of not less than 50 µm is preferred, and based on the graph at FIG. 16 it is preferred that filament diameter be not less than 100 µm is preferred.

Next, prevention of dislocation of covering 3 with respect to rotating support body 2, i.e., roller 1, in accordance with the present invention will be described. Selection is made from among various covered yarns 8e covered with filament(s) 7a of different coefficient(s) of friction, and knitting is carried out to produce knit fabric 3a. By causing the back surface of covering 3 comprising this knit fabric 3a to have high coefficient of friction, tension of covering 3 and gripping force due to friction between covering 3 and rotating support body 2 cause prevention of dislocation of covering 3 from rotating support body 2, and by causing yarn 8 comprising filament 7a of modified cross-section as at FIG. 10 to be used at covering 3 and by increasing the regions at which contact with rotating support body 2 occurs, a constitution is attained in which even greater prevention of dislocation of covering 3 is achieved. By moreover causing the surface of rotating support member 2 to possess recesses and projections due to fine texturing, elastic fiber 8b can be made to dig into the recesses and projections at rotating support member 2, as a result of which it will be possible to obtain gripping characteristics between covering 3 and rotating support body 2 even with low force of tightening (low tension).

Figure 17:
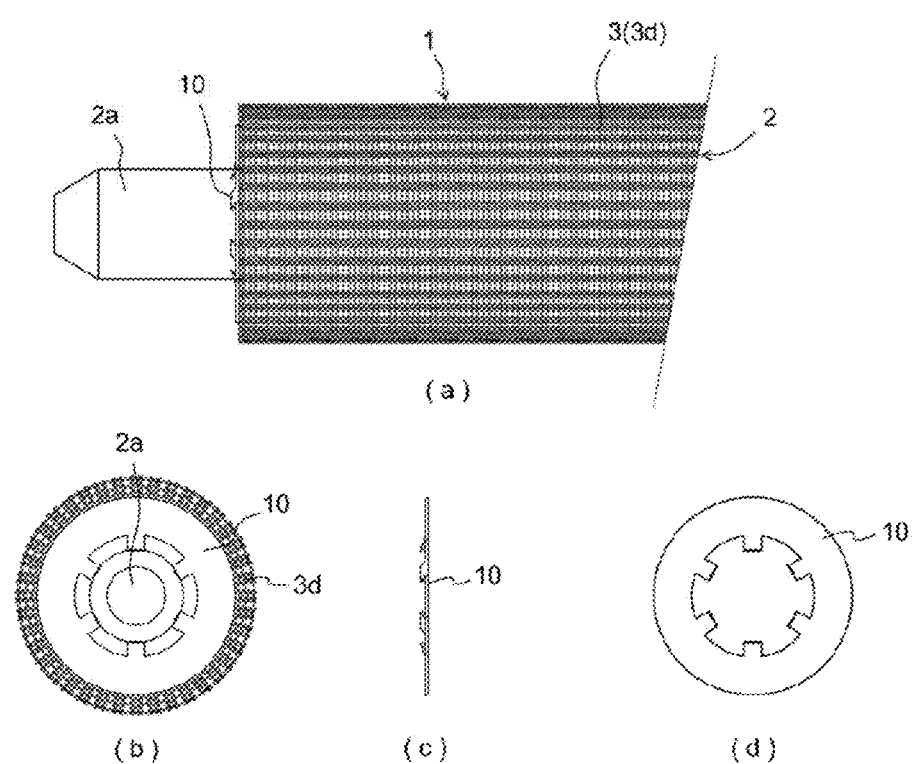
FIG. 17 Example in which a retainer ring is used to secure an end of a covering comprising cylindrical knit to a rotating support body, (a) being a front view thereof, (b) being a side view thereof, (c) being a side view of the retainer ring, and (d) being a front view of the retainer ring.

FIG. 17 is an example in which end(s) of covering 3 comprising cylindrical knit 3d are secured by retainer ring(s) 10. At FIG. 17, (a) is a front view in which knit fabric 3a which is covering 3 comprising cylindrical knit 3d is installed on rotating support body 2, retainer ring(s) 10 at (c) and (d) being fitted onto rotating shaft 2.a of rotating support body 2, end(s) of cylindrical knit 3d protruding from side(s) of rotating support body 2 being held down and secured as shown at (b) by retainer ring(s) 10. As a result of being secured in this fashion, fraying of end(s) of cylindrical knit 3d is prevented, and in addition, rotation due to dislocation of covering 3 comprising cylindrical knit 3d in the rotational direction of rotating support body 2 is prevented. (b) at FIG. 17 is a side view as seen from the side of rotating shaft 2a; (c) at FIG. 17 is a side view of retainer ring 10, and (d) is a plan view of retainer ring 10.

Figure 18:
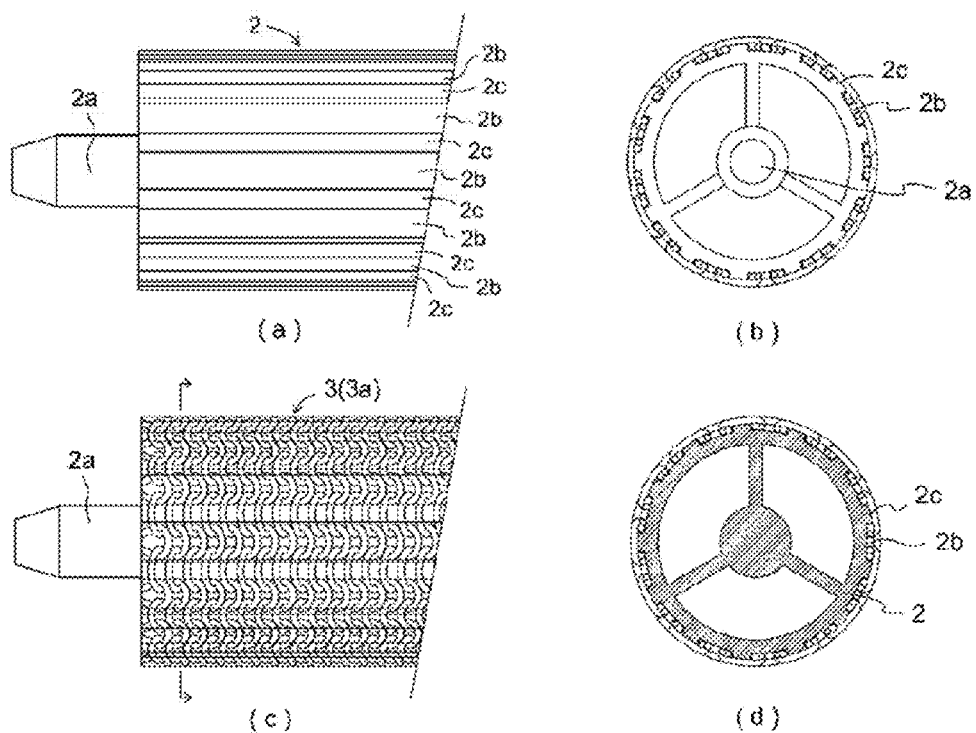
FIG. 18 Diagrams of an example in which, to prevent dislocation of a covering comprising cylindrical knit, strip-like recesses are provided in the axial direction of a rotating support body, and projections at entangled regions of the covering comprising knit fabric engage therewith, (a) being a front view of the rotating support body for the covering, (b) being a side view thereof, (c) being a front view of the rotating support body covered with a covering, and (d) being a sectional view as seen from the side thereof.

FIG. 18 is a drawing showing a structure in which strip-like recesses 2b of constant width and strip-like projections 2c of another constant width are provided in alternating fashion at the outside circumference of rotating support body 2 to prevent dislocation of covering 3 in the direction of rotation 1a of roller 1. Here, projections 2c which include small loops 4c produced by entangled regions 3b of yarn 8 in pattern of bands 4 at knit fabric 3a serving as covering 3 as shown at FIG. 3 and FIG. 4 are at the back side as shown at FIG. 13 and FIG. 14, and by causing these to engage with strip-like recesses 2b at rotating support body 2 as shown at (a) in FIG. 18, dislocation in direction of rotation 1a of covering 3 in the form of knit fabric 3a with respect to rotating support body 2 is prevented. (a) at FIG. 18 is a front view in which strip-like recesses 2b of constant width and strip-like projections 2c of another constant width are provided in alternating fashion at the outside circumference of rotating support body 2; (c) at FIG. 18 is a drawing in which projections 2c which include small loops 4c in pattern of bands 4 at covering 3 are at the back side, being installed on the outside circumference of rotating support body 2 such that these engage with strip-like recesses 2b at rotating support body 2; (b) at FIG. 18 is a side view of (c) as seen from the side of rotating shaft 2a; and (d) at FIG. 18 is a sectional view of a section taken at a location where covering 3 is present in (c) at FIG. 18 as seen in the direction indicated by the arrows.

Figure 19:
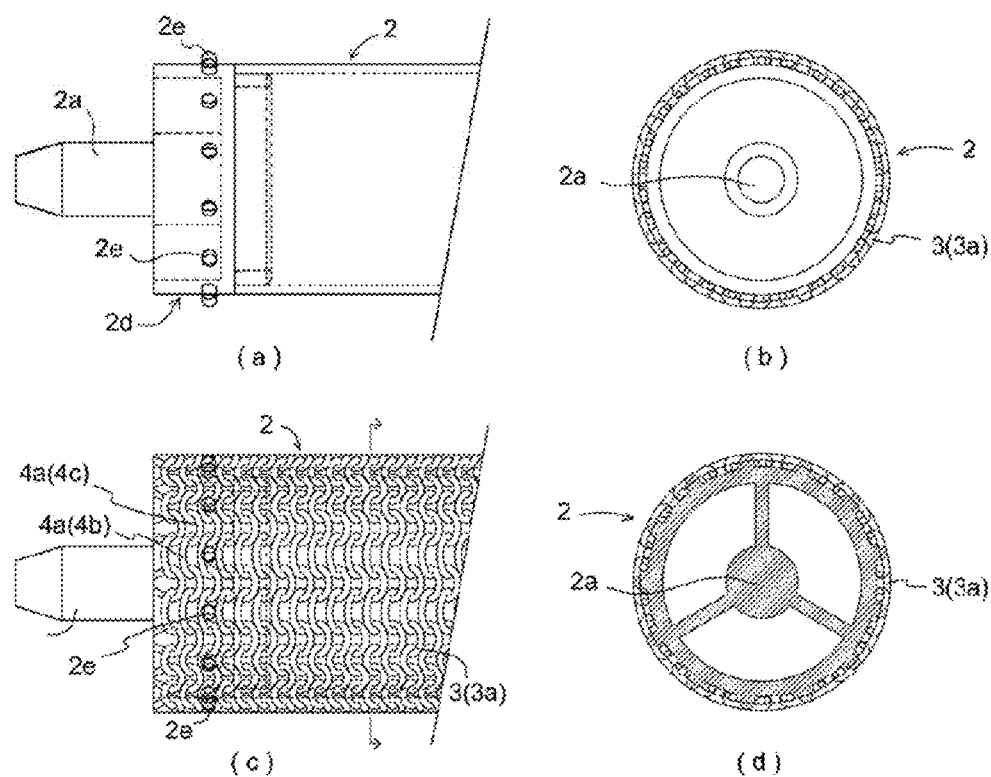
FIG. 19 Diagrams of an example in which, to prevent dislocation of a covering comprising knit fabric, protrusions are provided on a flange at an end of a rotating support body, and gaps in the covering are made to engage with the protrusions, (a) being a front view of the rotating support body, (b) being a side view thereof, (c) being a front view of the rotating support body covered with a covering, and (d) being a sectional view as seen from the side thereof.

FIG. 19 shows an example in which protrusions 2e are provided at region(s) of flange(s) 2d at end(s) of rotating support body 2 to prevent dislocation of knit fabric 3a serving as covering 3. Raised protrusions 2e are provided at region(s) of flange(s) 2d at end(s) of rotating support body 2 as shown at (a) in FIG. 19, the constitution being such that protrusions 2e of said flange(s) 2d engage with gaps formed in converse fashion between mutually adjacent loops 4a of knit fabric 3a serving as covering 3 as shown at (c) in FIG. 19. The heights of these protrusions 2e are such that, where there is an opposing roller at a location to the exterior of the conveyed object, heights of protrusions 2e are of such height as will not cause interference with that roller; and where there is another object at a location within conveyance of the conveyed object, heights of protrusions 2e are made to be not greater than the thickness of knit fabric 3a serving as covering 3 so as not to interfere with the other object, or heights of protrusions 2e are made to be less than the thickness at all locations across the entire surface of covering 3. Moreover, (b) at FIG. 19 is a side view of (c) as seen from the side of rotating shaft 2a; and (d) at FIG. 19 is a sectional view of a section taken at a location where covering 3 is present in (c) at FIG. 19 as seen in the direction indicated by the arrows. Moreover, to prevent rotational dislocation, instead of providing protrusions 2e, although not shown in the drawings it is also possible to, at location(s) not in region(s) which make contact with the conveyed object, use adhesive or thermal welding to mutually secure covering 3 and the rotating support body 2 that supports covering 3.

Figure 20:
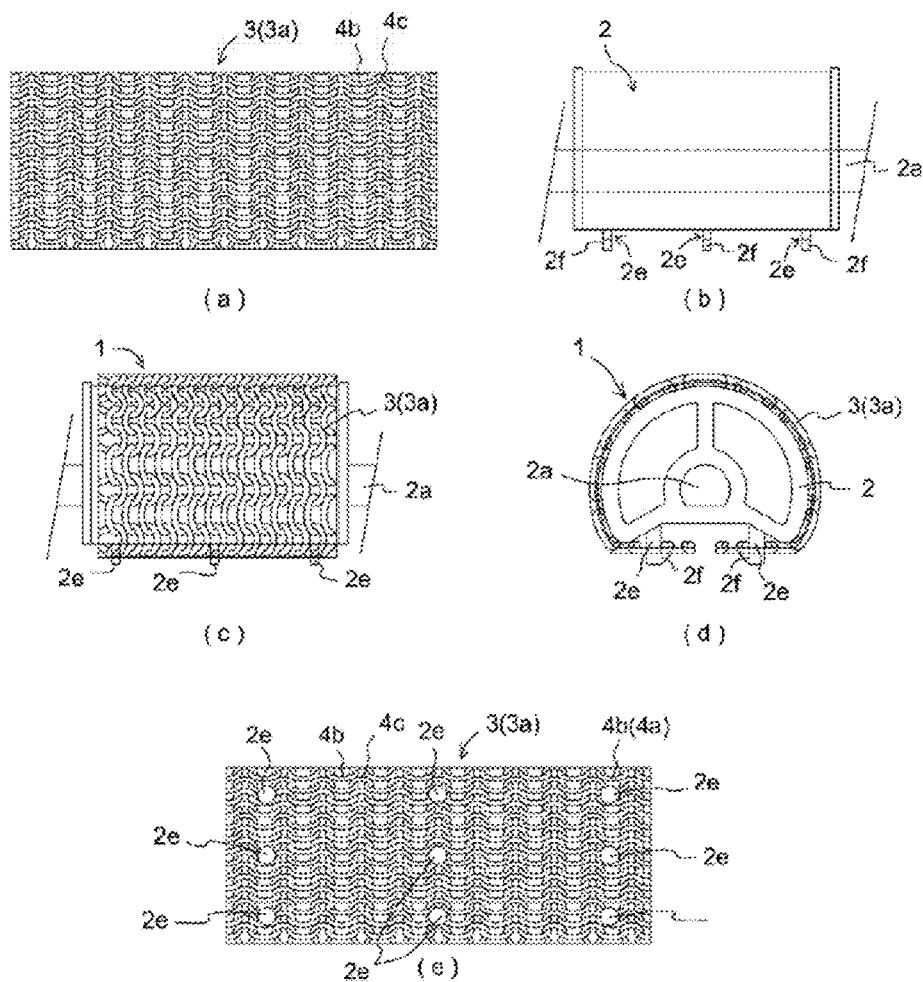
FIG. 20 Drawing showing a situation in which dislocation prevention means for a sheet-like covering comprising knit fabric is installed on a rotating support body having semicircular cross-section, (a) being a plan view of a sheet-like covering comprising knit fabric installed on a rotating support body having semicircular cross-section, (b) being a front view of a rotating support body having semicircular cross-section, (c) being a front view in which dislocation prevention means for a sheet-like covering comprising knit fabric is attached to a rotating support body having semicircular cross-section, (d) being a side view of a rotating support body having semicircular cross-section, and (e) being a plan view of a sheet-like covering comprising knit fibric is retained by protrusions and covers a rotating support body having semicircular cross-section.

FIG. 20 is an example of a situation in which knit fabric 3a serving as covering 3 is employed at pickup roller 1 having semicircular cross-section employed at a paper tray used in an electrophotographic apparatus or the like. Here, knit fabric 3a serving as covering 3 is formed not in cylindrical but in sheet-like fashion as shown at (a) in FIG. 20, protrusions 2e being formed in such fashion as to have hooks 2f below rotating support body 2 as shown at (b) in FIG. 20, such that large loops 4b at knit fabric 3a serving as covering 3 can be made to catch thereon as shown at (c) and (d) in FIG. 20, so as to prevent rotational dislocation of covering 3 in the form of knit fabric 3a from rotating support body 2 having semicircular cross-section. That is, as shown at (d) in FIG. 20, as means for preventing dislocation of covering 3, protrusions 2e having hooks 2f are provided below rotating support body 2, knit fabric 3a of covering 3 which has been cut into sheet form and which has high coefficient of friction at the surface thereof being stretched so as to permit attachment to protrusions 2e having hooks 2f at rotating support body 2, as a result of which dislocation of covering 3 is prevented. Here, because covering 3 is constituted such that knit fabric 3a has undergone operation(s) to prevent fraying at end(s) thereof, this covering 3 has a constitution that allows it to be attached in sheet form to protrusions 2e having hooks 2f. Moreover, (e) in FIG. 20 is a drawing showing sheet-like knit fabric 3a serving as covering 3, which shows locations where engagement by protrusions 2e provided below rotating support body 2 occurs. Where covering 3 is constituted from artificial fiber as knit fabric 3a, because it will have good permeability with respect to adhesive, and because covering 3 will have stretchability in the rotational direction, such a covering 3 may be satisfactorily made to adhere to a rotating support body 2 having semicircular cross-section even where adhesion is carried out in such fashion that adhesive is applied only to portion(s) thereof. In such case, knit fabric 3a serving as covering 3 need not be made to catch on and be held by protrusions 2e as described above. Moreover, where yarn 8 containing tow-melting-point fiber is used to constitute knit fabric 3a, such knit fabric 3a might be made to cover rotating support body 2, following which thermal fusing might be carried out to secure knit fabric 3a to rotating support body 2. Thus, the example at FIG. 20 is constituted such that sheet-like covering 3 is provided at the surface of rotating support body 2 having semicircular cross-section. As described above, the invention under application is a roller 1 formed by causing it to be covered with sheet-like covering 3 or covering 3 in the form of cylindrical knit 3d.

As has already been described, FIG. 21 is an example of a roller 1 for air cooling or air suction. As shown at (a) in FIG. 21, roller 1 has hole(s) 11 produced by machining or other such operation or hole(s) 11 produced during molding of resin at the core serving as rotating support body 2, air passage(s) 11a serving as hole(s) 11 being formed at the surface of rotating support body 2. (b) at FIG. 21 shows a constitution in which covering 3 comprising knit fabric 3a is arranged at rotating support body 2. In such constitution, air is injected or sucked through air passage(s) 11a serving as hole(s) 11 provided at the side surface(s) of rotating support member 2. Furthermore, as core serving as rotating support body 2, this may be a rotating support body 2 produced by extrusion operation(s) or a rotating support body 2 produced by die molding, hole(s) 11 in the form of slit(s) produced by extrusion operation(s) and/or hole(s) 11 produced by molding being provided therein as necessary. (c) at FIG. 21 is a side view of (b) as seen from the side of rotating shaft 2a, air passage 11a being formed in the central portion thereof (d) at FIG. 21 is a sectional view of a section taken at and seen in the direction indicated by the arrows at (b). By constituting this in this fashion so that covering 3 comprising knit fabric 3a is provided at the surface of rotating support member 2, it will be possible to eliminate artifacts due to offsetting and/or scratches which might otherwise appear on the sheets or other such conveyed objects that are conveyed thereby.

Figure 22:
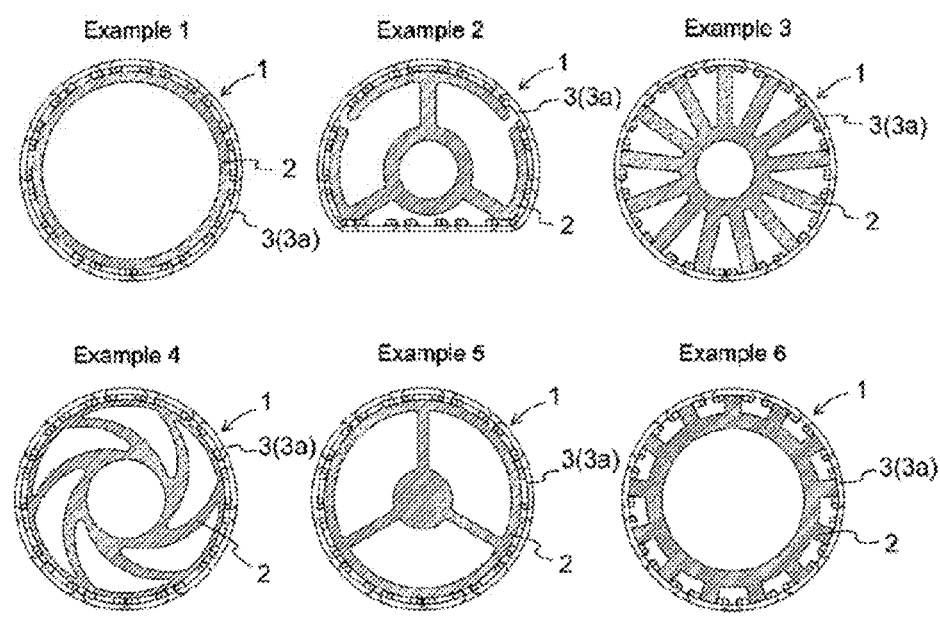
FIG. 22 Sectional views taken perpendicular to axes of rotation of various rollers serving as rotating support bodies for coverings.

FIG. 22 shows various exemplary cross-sectional shapes of rollers 1, each of which is formed by covering a rotating support body 2 with a covering 3 in the form of knit fabric 3a, these being six in number and being listed as Example 1 through Example 6. These examples are such that, at each example, knit fabric 3a serving as covering 3 covers the circumferential surface of rotating support body 2 in such fashion that projections 2c which include small loops 4c are at the back surface. Note that Example 2 is a drawing showing the cross-sectional shape of a roller 1 in which covering 3 covers a rotating support body 2 having a semicircular cross-section.

Figure 23:
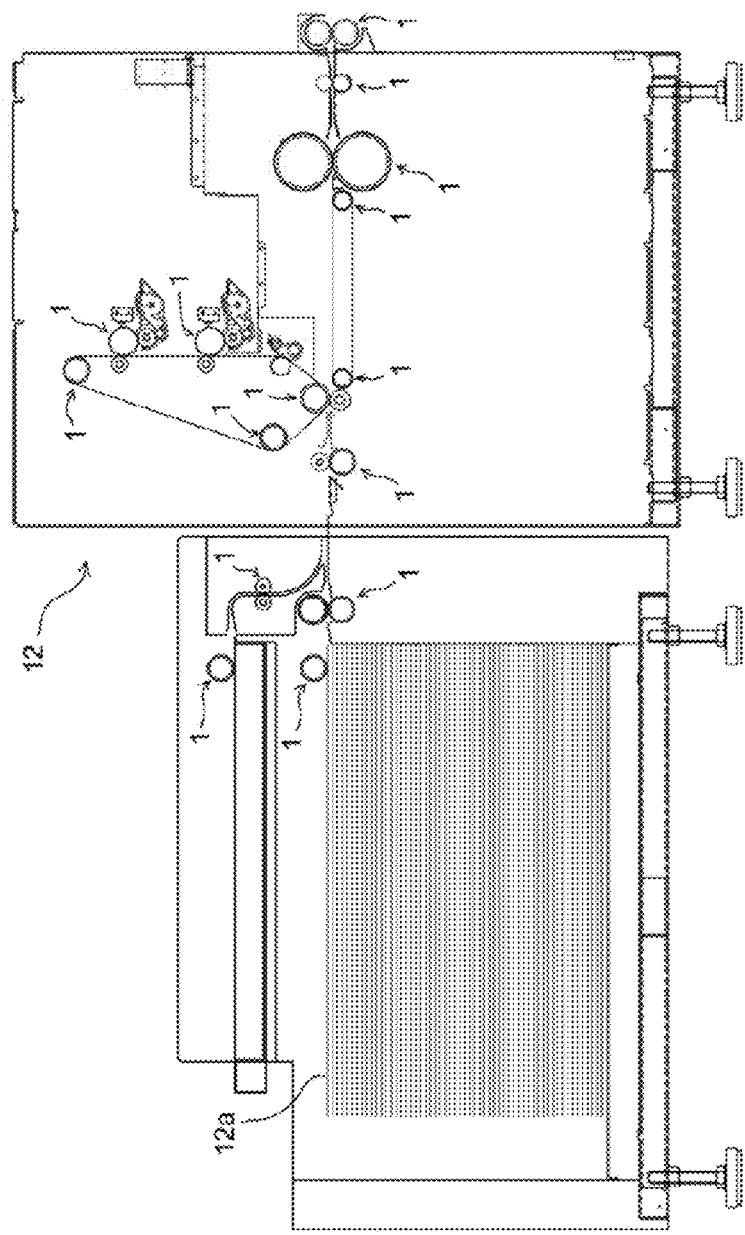
FIG. 23 Drawing showing, in schematic fashion, rollers used at the interior of a printing apparatus which employs various rotating support bodies serving as rollers.

At FIG. 23, in the context of a printing apparatus 12 employing various rollers 1, locations where those various rollers 1 may be used are shown. Thus, at an electrophotographic apparatus which may even be a printing apparatus 12 employing paper 12a, various rollers 1 associated with respective inventions under application may be used at various locations. For example, at a roller 1 for supplying paper 12a, yarn 8 having high coefficient of friction may be used at yarn 8 in knit fabric 3a serving as covering 3 arranged at the circumferential surface of rotating support body 2. Thus, in correspondence to the function of each roller 1, covering 3 in the form of knit fabric 3a comprising insulating fiber, electrically conductive fiber, and/or other such yarn 8 having function(s) may be arranged at the circumferential surface of rotating support body 2 to produce such apparatus rollers 1.

Figure 24:
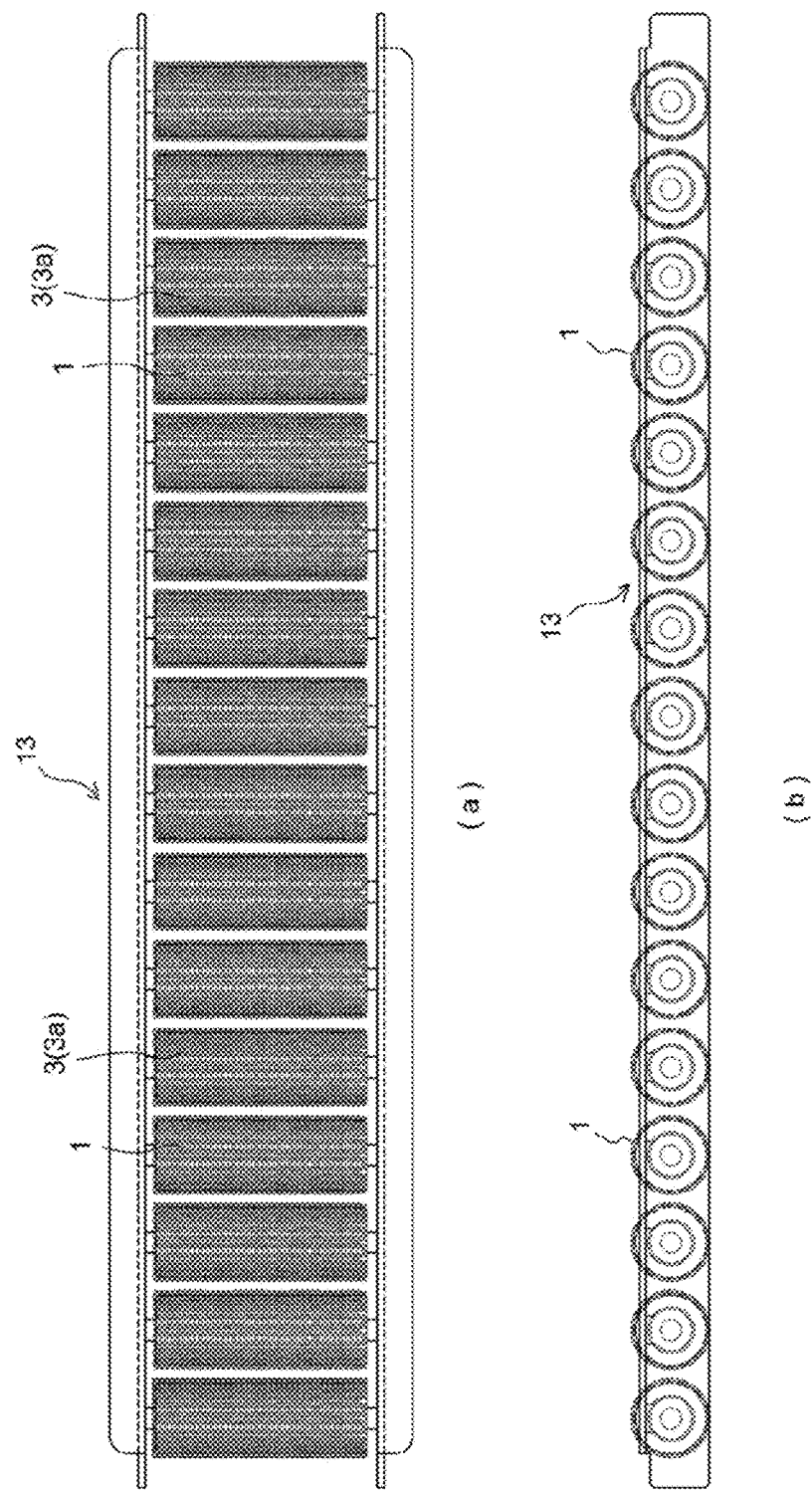
FIG. 24 Plan View and side view showing a roller conveyor which employs rotating support bodies serving as rollers.

FIG. 24 is an example in which rollers 1 in accordance with the present invention are employed at roller conveyor 13 which conveys various conveyed objects placed thereon, (a) being a plan view and (b) being a front view. Here as well, for proper conveyance of various conveyed objects, the roller conveyor 13 is produced by employing rollers 1 that have at the surfaces thereof coverings 3 in the form of knit fabric 3a comprising yarn(s) having coefficient(s) of friction compatible with such conveyed objects.

Figure 25:
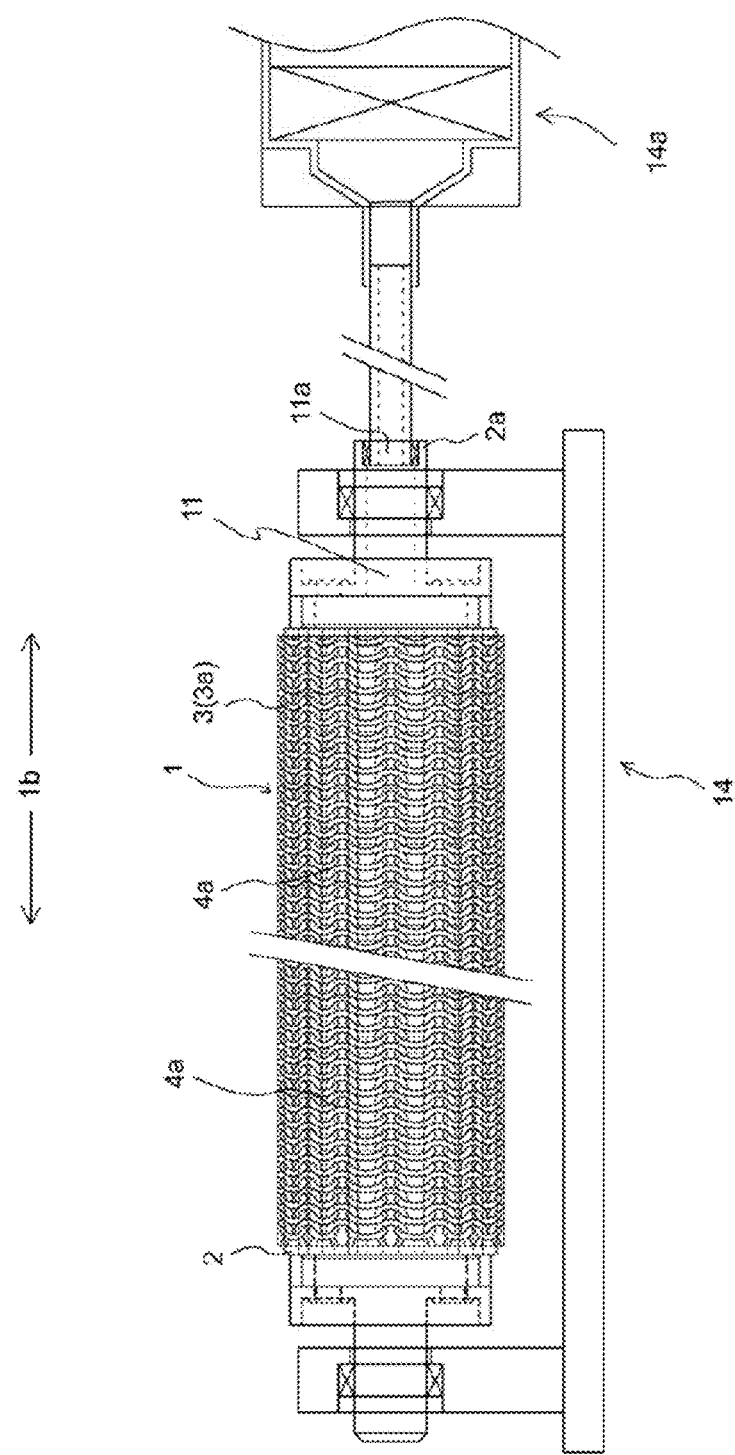
FIG. 25 Front view showing in simplified fashion a suction roller apparatus that employs rotating support body.

FIG. 25 shows a schematic diagram of a suction roller apparatus 14 for conveying a conveyed object. As shown in FIG. 25, this roller 1 is such that covering 3 comprising knit fabric 3a having air permeability covers cylindrical rotating support body 2 having air passage(s) 11a at surface(s) thereof. Air is sucked by fan or compressor at low-pressure chamber 14a connected to air passage(s) 11a serving as hole(s) 11 formed at rotating shaft 2a at the end(s) of this roller 1, the constitution being such that suction takes place by way of said air passage(s) 11a. Because air suction is possible by way of gaps between neighboring loops 4a constituting stitches in knit fabric 3a and air passage(s) formed at surface(s) of the rotating support body 2 covered thereby, because gaps between neighboring loops 4a constituting stitches in knit fabric 3a are uniform in the axial direction 1b of rotating shaft 2a, and because said knit fabric 3a comprises yarn 8 in which there is filament 7a as shown in FIG. 9 or FIG. 10 which is made of synthetic fiber, scratches and the like tend not to be produced at either the front surface or the back surface of the sheet constituting the conveyed object that is acted upon by suction, this being a roller 1 which permits uniform suction as shown in FIG. 25. Furthermore, resistance to airflow of this suction roller apparatus 14 may be arbitrarily set by varying diameter 3c of filament 7a and density of loops 4a comprising stitches at knit fabric 3a.

Figure 26:
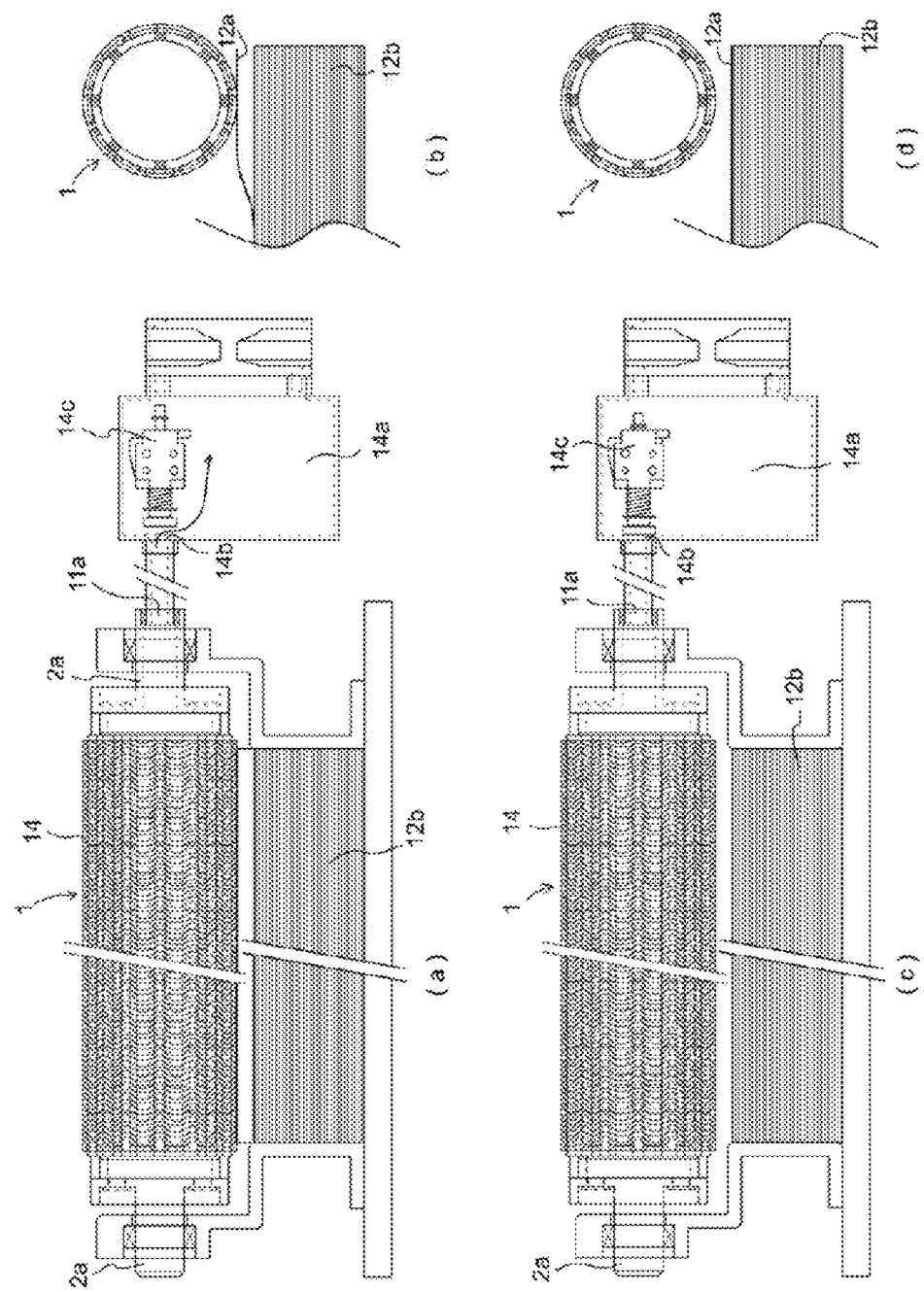
FIG. 26 Plan view and front view showing the situation when suction is occurring, and plan view and front view showing the situation when suction is not occurring, at a suction roller apparatus equipped with a suction roller and a low-pressure chamber for producing suction.

FIG. 26 is an example of a conveyor apparatus that generates suction below suction roller 1 to pick up paper 12a one sheet at a time from paper stack 12b, causing this to be conveyed in the direction of rotation as roller 1 rotates. (a) at FIG. 26 is a front view, the topmost sheet from paper stack 12b below roller 1 being sucked on and picked up as shown at (b) in FIG. 26 as it is conveyed in the direction of rotation of roller 1. Here, solenoid valve 14c at low-pressure chamber 14a shown at the right side at (a) in FIG. 26 is opened, causing port 14h of low-pressure chamber 14a connected to air passage 11a serving as hole 11 formed at rotating shaft 2a at the right end of suction roller 1 to be opened, and causing air to be sucked in the direction indicated by the arrow. On the other hand, when, as shown at (d) in FIG. 26, suction is not occurring and paper 12a is not being picked up from paper stack 12b, solenoid valve 14c at low-pressure chamber 14a shown at the right side at (c) in FIG. 26 is closed, causing port 14b of low-pressure chamber 14a to be closed, so that suction by low-pressure chamber 14a does not occur.

Furthermore, although not shown in the drawings, projections 2c are formed at the front surface of back surface of covering 3 of rotating support body 2 serving as roller 1, the constitution being such that the surface opposite the surface where projections 2c are present is a more or less flat surface that is almost completely undisturbed by projections 2c. Where knit fabric 3a serving as covering 3 is arranged at rotating support body 2 so as to cause projections 2c to be present at the front surface, because it will be possible to cause contact with the conveyed object to be made at a plurality of points, this will permit conveyance to be carried out in more stable fashion. Furthermore, where projections 2c are arranged at the back surface, and the flat surface is arranged at the front surface, this will make it possible to suppress occurrence of scratches on the conveyed object which might otherwise be produced due to the force of suction or the force of pressure from covering 3 at rotating support body 2 of roller 1 which acts on the conveyed object during conveyance thereof.

Working Example 1

TABLE 1 shows working examples of knit fabric 3a serving as covering 3 in accordance with the invention under application. As shown at the working examples and at (b) in FIG. 3, formation of step(s) 6 is made possible as a result of formation of locations where there are large loops 4b and locations where there are small loops 4c by yarn 8. Moreover, as indicated at Working Examples 1 through 4, by causing knit fabric serving as covering to comprise plated fiber in which urethane serving as elastic fiber 8b was used as plating yarn, i.e., plated yarn 8e in which urethane fiber was plated therein, causing elastic fiber 8b to appear at the front surface made it possible to achieve a coefficient of friction of around 1.0, permitting gripping characteristics to be obtained. In contradistinction hereto, as indicated at Working Example 5, where knit fabric 3a comprised conditions such that plated yarn employing urethane was not present and elastic fiber was not imparted thereto, this permitted achievement of a coefficient of static friction which was low, the value thereof being 0.27. Thus, at covering 3 comprising knit fabric 3a, coefficient of friction may be made to be a low coefficient of friction or a high coefficient of friction depending on the configuration of yarn 8; and by causing such knit fabrics 3a to be provided at the surface of rotating support body 2, it is possible to cause roller 1 to be imparted with the required coefficient(s) of friction. Moreover, with respect to fraying of ends of knit fabric 3a, the end of knit fabric 3a was rubbed with #30 sandpaper, as a result of which if no end fraying phenomena were observed after rubbing 10 or more times, a "O" was entered at TABLE 1 to indicate that the result of the fraying test was satisfactory. Fraying was such that fraying was prevented regardless of whether urethane fiber was present. In this regard, as mentioned in the description, monofilament undergoes plastic deformation, preventing fraying. Moreover, regarding resistance to airflow of the coverings, because monofilament was used as base at filament 7a making rip yarn 8, and because there was no unraveling and spreading of yarn 8, it was possible to ensure adequate air permeability, resistance to airflow at the present Working Examples being such as would not present a problem.

TABLE 1

|  | Working Example 1 | Working Example 2 | Working Example 3 | Working Example 4 | Working Example 5 |
| --- | --- | --- | --- | --- | --- |
| Covering | Knit fabric | Knit fabric | Knit fabric | Knit fabric | Knit fabric |
| Filament material | Nylon (170 μm) | Nylon (150 μm) | Nylon (120 μm) | Nylon (120 μm) | Nylon (150 μm) |
| Plating fiber used in plated yarn | Urethane 110 (D/F) | Urethane 110 (D/F) × 2 | Urethane 110 (D/F) | Urethane 110 (D/F) × 2 | — |
| Yarn density in axial direction (yarns/in) (at large loops) | 64 | 46 | 64 | 64 | 64 |
| Loop pitch in rotational direction (mm) | 1.27 | 1.15 | 1.27 | 1.27 | 1.27 |
| Heat-setting (115° C. steam) | Yes | Yes | Yes | Yes | Yes |
| (1) Thickness of covering (mm) | 0.49 | 0.46 | 0.34 | 0.36 | 0.42 |
| (2) Thickness at large loops (mm) | 0.24 | 0.23 | 0.18 | 0.22 | 0.17 |
| Step = (1) − (2) (mm) | 0.25 | 0.23 | 0.16 | 0.14 | 0.25 |
| Resistance to airflow of covering (KPa · s/m) | 0.0047 | 0.0114 | 0.003 | 0.0069 | 0.0027 |
| Coefficient of static friction | 1.09 | 0.98 | 1.04 | 1.0 | 0.27 |
| Fraying test | O | O | O | O | O |

Figure 27:
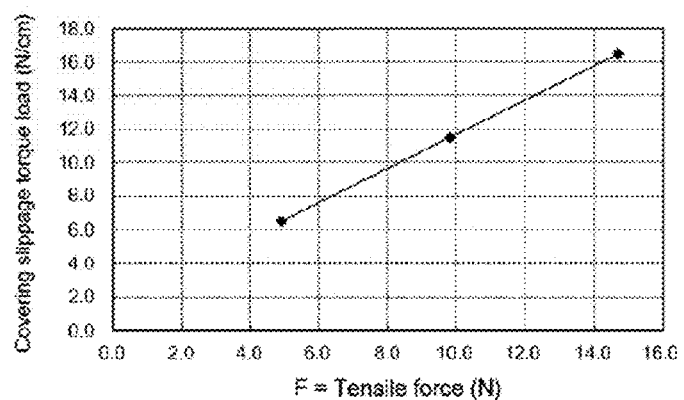
FIG. 27 Graph showing relationship between slippage torque load and tensile force at a covering made of knit fabric.
Figure 28:
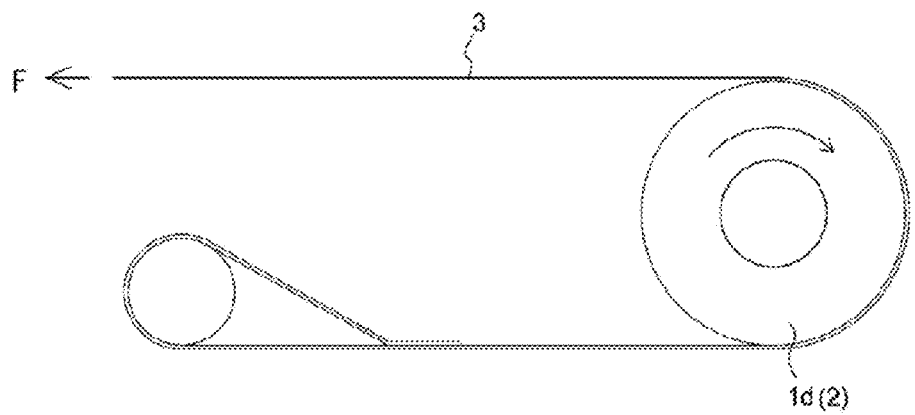
FIG. 28 Simplified diagram showing in schematic fashion an apparatus used for measurement of slippage torque load.

FIG. 27 shows a graph of measurements of torque to induce slippage between rotating support body 2 and covering 3 at roller 1. Furthermore, FIG. 28 shows a schematic diagram of the measurement method employed thereat, in which force F is applied in the direction opposite the direction of rotation of aluminum roller 1d. At the measurement method schematic diagram of FIG. 28, as a result of measurement of torque to induce slippage with respect to aluminum roller 1d, the torque load to induce slippage between a covering 3 of test width 20 mm comprising knit fabric 3a containing urethane fiber and an aluminum roller 1d serving as rotating support body 2 as shown in FIG. 28 was such that slippage torque load increased in linear fashion with increase in the tensile force, i.e., force of tightening, of covering 3 with respect to aluminum roller 1d. In other words, increase in the force of tightening or force of adhesion with respect to rotating support body 2 decreased the tendency for dislocation to occur. Note that in an ordinary roller apparatus that carries out conveyance by formation of a nip between rollers 1, nip pressure is such that load per cm of width is 0.5 N to 1.0 N, and is 2 N at most. The reason for this nip pressure is so as not to produce scratches on sheets; this is also the nip pressure which is required to obtain precision feeding. In contrast, based on the results of measurement of an aluminum roller 1d in accordance with the present invention, as shown in the graph at FIG. 27, as slippage torque load increases in linear fashion as a function of tensile force, i.e., force of tightening, to produce a torque load such as will prevent dislocation of the covering, a slippage torque load which is more than adequate can be obtained. Furthermore, looking at the inclination, i.e., slope, of this graph, the value of the slope is approximately 1.0, which indicates the coefficient of friction between the covering and the aluminum serving as the rotating support body, this value being approximately the same as the coefficient of friction which is obtained relative to freestanding aluminum.

Figure 29:
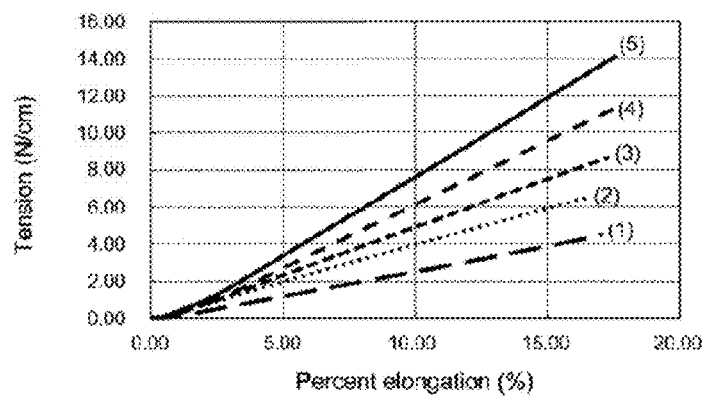
FIG. 29 Graph showing how the relationship between tension and percent elongation at a covering made of knit fabric changes as a function of the number of yarns in the axial direction.

Next, results of measurements of the relationship between elongation (%) and tension (N/cm) for knit fabric 3a serving as covering 3 employed in the present invention are shown at FIG. 29. As shown in FIG. 29, in the context of a knit fabric 3a comprising yarn 8 containing elastic fiber 8b, i.e., a knit fabric 3a made of yarn 8 in which core yarn 8a is monofilament comprising Nylon and in which plated yarn 8e is plated-yarn-knit which is urethane fiber, it is clear that, depending on knitting conditions and usage conditions (percent elongation), a knit fabric 3a can be adequately achieved which is such that a tension of 2 N or more per 1 cm of unit width can be obtained therefrom. Furthermore, even where core yarn 8a is made thin, it is possible to obtain tension (force of tightening) by increasing percent elongation and yarn density in the axial direction 1b. In the graph, note that measurements were carried out on samples for which the number of yarns 8 in the axial direction 1b was 52 yarns per inch for a core yarn of diameter 120 μm at (1), 40 yarns per inch for a core yarn of diameter 150 μm at (2), 44 yarns per inch for a core yarn of diameter 150 μm at (3), 50 yarns per inch for a core yarn of diameter 150 μm at (4), and 54 yarns per inch for a core yarn of diameter 150 μm at (5).

Figure 30:
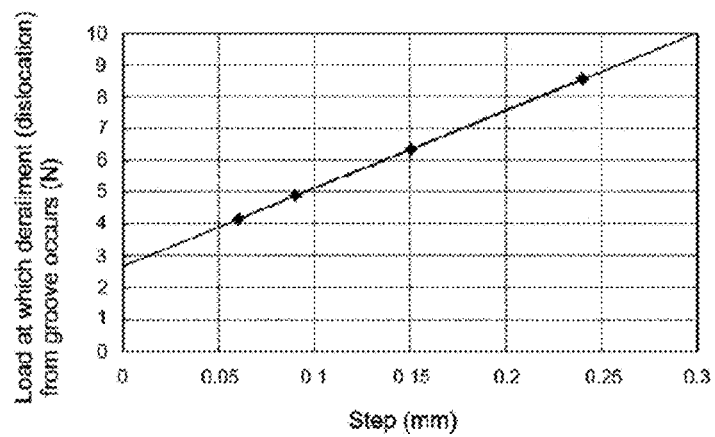
FIG. 30 Graph showing relationship between step and dislocation load (escape load) necessary to cause a strip-like recess to escape from said step.

Next, effect of step 6, shown in FIG. 3, of knit fabric 3a is indicated. Here, to increase the size of step 6 is to increase the size of step 6 which is the depth of the recess, i.e., groove, comprising the space between the recess of large loop 4b and the projection of small loop 4c constituting entangled region 3b at knit fabric 3a in pattern of bands 4 at knit fabric 3a serving as covering 3. In other words, FIG. 30 shows the relationship between the step 6 which is the depth of the groove serving as recess and the load on the conveyed object fed thereto which is necessary to cause the strip-like protrusion which engages with the groove serving as recess to be made to escape and be dislocated in the lateral direction from the groove serving as recess. Based on the graph shown in this FIG. 30, the step and the dislocation load that must act on the conveyed object before it will escape in the lateral direction from the groove serving as recess increase in linearly proportional fashion. From this, it is clear that by causing the value of step 6 to be made large it will be possible to prevent dislocation of a covering 3 which engages with step 6. In the graph, note that measurements were carried out on a knit fabric 3a under conditions such that the coefficient of friction of the knit fabric 3a which did not contain elastic fiber 8b was 0.25, length of stripes in the pattern of bands 4 was 40 min, load was 32 g per 1 cm$^2$, pitch of stripes in the pattern of bands 4 was 4 mm, and width of stripes in the pattern of bands 4 was 2 mm.

Figure 31:
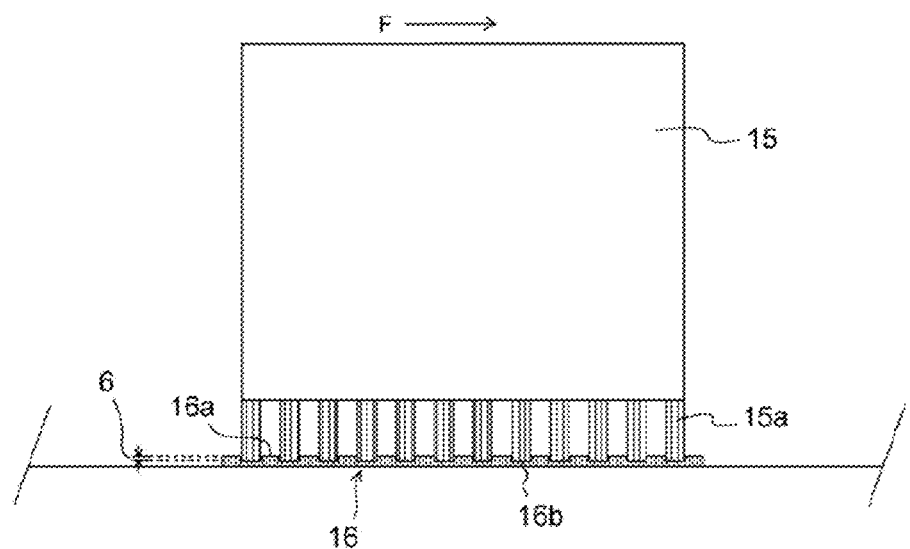
FIG. 31 Diagram for reference for measurement/testing of dislocation load (escape load) necessary to cause escape.

FIG. 31 is a diagram for reference for a test piece for testing the relationship between the size of the step 6 and the size of the dislocation load F necessary to cause strip-like foot protrusion 15a of conveyed piece 15 representing the aforementioned conveyed object to be made to escape toward the right as shown in the drawing from step 6 comprising strip-like projection 16a, being made up of an irregular surface piece 16 that forms the sizes of strip-like groove 16b with which strip-like foot protrusion 15a of conveyed piece 15 engages and of strip-like projection 16a constituting step 6 which regulates escape.

As described above, it is possible to form stripe-like step(s) 6 at knit fabric 3a, and by means of a knit fabric 3a produced using appropriate knitted conditions to form air permeability in correspondence to requirements. If the direction of such stripes at knit fabric 3a is made to be the axial direction 1b, and if this is made to cover the surface of rotating support body 2 so as to be roughly perpendicular to the rotational direction 1a to produce roller 1, when projections 2c are provided in such fashion that they are at the front surface, it will be possible to cause contact with the conveyed object as seen in sectional view to be constituted such that there is two-point contact, making it possible to achieve further improvement in conveying force. Moreover, it will be possible to reduce adherence of dust, paper dust, and/or the like at the surface of rotating support body 2 to the point of insignificance, and it will be possible to achieve a roller 1 permitting decrease in conveying force to be reduced to the point of insignificance. Furthermore, when projections 2c are provided in such fashion that they are at the back surface of knit fabric 3a serving as covering 3, the front surface of knit fabric 3a will assume a more or less flat state, making it possible to reduce the tendency for scratches to form on sheets or other such thin conveyed objects, and also making it possible to cause projections 2c to engage with grooves provided at the surface of rotating support body 2 and to carry out prevention of dislocation of covering 3 in the rotational direction.

The effect of vents comprising stitches at knit fabric 3a is of course optimal for use as a roller 1 in an apparatus that carries out cooling, drying, and/or suction. Moreover, even where no hole is formed in rotating support body 2, as a result of steps 6 of knit fabric 3a that are formed at the surface, it will be possible to cause dust, paper dust, and/or the like to be trapped within vents or recesses 2b. This will make it possible to reduce the influence of dust and paper dust at location(s) that come in contact with the conveyed object, permitting conveyance to be made stable over long periods of time. Moreover, because urethane fiber which is resistant to wear and which has high coefficient of friction can be provided at the front surface of knit fabric 3a serving as covering 3, it is possible to achieve longer life.

Furthermore, at conventional rollers 1 which have recesses and projections and at which surface layer(s) comprise rubber layer(s), recesses and projections have been provided to reduce contamination at the surface of roller 1 due to dust, paper dust, and the like in attempts to stabilize conveyance characteristics. However, because recesses and projections are formed from rubber layer(s), the rubber must be of certain thickness(es). Moreover, because the rubber layer(s) at the recesses and projections are elastic bodies, it has been extremely difficult to obtain high precision at the outside diameter of the roller 1. For this reason, rubber rollers having recesses and projections have often been used as feed rollers, idler rollers, and in other such situations where high precision at the outside diameter is not demanded. However, roller 1 in accordance with the invention under application is a thin covering 3 comprising knit fabric 3a serving as covering 3, and where this is formed such that monofilament is used as base at core yarn 8a, thickness will be determined by the diameter of the monofilament and the yarn diameter where there is entanglement with core yarn 8a. Although precision of the thickness of roller 1 in accordance with the invention under application will therefore be high, the constitution is such that there will be a dependency upon the precision of rotating support body 2. Accordingly, it will be possible to obtain precision which has been made stable, precision being dependent upon the precision of the metal where rotating support body 2 is metal, and being dependent upon the precision with which the resin is molded where rotating support body 2 is molded resin. Moreover, with respect to gripping characteristics which are a property of rubber, employment of elastic fiber 8b comprising urethane fiber or the like at the yarn of knit fabric 3a serving as covering 3 of roller 1 instead of rubber will make it possible to obtain gripping characteristics equivalent to or better than those of rubber.

Thus, as a result of employment of a roller 1 covered by a covering 3 comprising knit fabric 3a, it is possible to form a low-cost apparatus which did not exist conventionally and which permits conservation of resources, conservation of energy, and recycling.

EXPLANATION OF REFERENCE NUMERALS

1 Roller
1a Rotational direction (conveying direction; gauge direction)
1b Axial direction (width direction; stitch direction)
1c Surface (of roller)
1d Aluminum roller
2 Rotating support body
2a Rotating shaft
2b Recess
2c Projection
2d Flange
2e Protrusion
2f Hook
3 Covering
3a Knit fabric
3b Entangled region
3c Diameter (of yarn)
3d Cylindrical knit
4 Pattern of bands
4a Loop
4b Large loop
4c Small loop
5 Curvature (slack)
6 Step
7 Fiber
7a Filament
8 Yarn
8a Core yarn
8b Elastic fiber
8c Covered yarn
8d Twisted yarn
8e Plated yarn
9 Lateral width
10 Retainer ring
11 Hole
11a Air passage
12 Printing apparatus
12a Paper
12b Stack (of paper)
13 Roller conveyor
14 Suction roller apparatus
14a Low-pressure chamber
14b Port
14c Solenoid valve
15 Conveyed piece
15a Strip-like foot protrusion
16 Irregular surface piece
16a Strip-like projection
16b Strip-like groove
Pg Pitch in gauge direction
Ps Pitch in stitch direction
F Dislocation load

The invention claimed is:

1. A roller comprising:
a rotating support body;
a covering comprising knit fabric covering the surface of the rotating support body, the covering having gaps for air permeability comprising loops of yarn,
wherein the knit fabric has steps comprising stripes in a pattern of bands in a knit fabric at a front surface or a back surface thereof, and has the stripes in the pattern of bands produced by these steps, and is supported by the surface of the rotating support body so as to be arranged such that the stripes in the pattern of bands at this knit fabric are approximately perpendicular to a rotational direction;
this knit fabric has small loop regions and large loop regions at which loops of different size and shape are mutually adjacent in a gauge direction constituting the rotational direction; loops at these large loop regions are constituted so as to have little slack as a result of plastic deformation of the yarn; loops in the small loop regions adjacent to the large loop regions are constituted in continuous fashion to contain entangled regions of the yarn in a stitch direction constituting an axial direction;
this knit fabric comprises two domains, these being a domain at the large loop regions comprising the constitution having little slack in the yarn and a domain at the small loop regions containing the entangled regions of the yarn; the steps comprising the knit fabric being present between the small loop regions and the large loop regions; the large loops comprising the constitution having little slack being formed in continuous fashion in the axial direction at a pitch of the small loops at the steps; and
the knit fabric is formed such that it comprises the pattern of bands produced by serial arrangement of the domains of the small loops in the axial direction and by serial arrangement of the domains of the large loops with little slack in the yarn in the rotational direction; and this knit fabric is provided as the covering at the surface of the rotating support body.

2. The roller according to claim 1, wherein the knit fabric having the stripes in the pattern of bands produced by the steps has end fraying prevention means by which prevention of fraying of an end of the yarn is carried out at the knit fabric or at the surface of the roller comprising the rotating support body that supports the knit fabric; and the roller comprising this rotating support body has means for preventing the covering comprising the knit fabric from being dislocated in the axial direction and in the rotational direction from the rotating support body by which it is supported due to rubbing and compression when the roller is rotating.

3. The roller according to claim 2, wherein the end fraying prevention means by which prevention of fraying of the end of the yarn is carried out at the knit fabric or at the surface of the roller is fraying prevention making use of slack at plastic deformation of the yarn, fraying prevention making use of compressive contact of the end by an antirotation member, fraying prevention making use of impregnation of the yarn by a coating agent or impregnation of the yarn by a low-viscosity adhesive, or fraying prevention making use of thermal fusing of low-melting-point hot-melt yarn included within the yarn; and the means for preventing the covering comprising the knit fabric from being dislocated in the axial direction and in the rotational direction from the rotating support body by which it is supported due to rubbing and compression when the roller is rotating is dislocation prevention making use of at least one among dislocation prevention making use of a gripping force comprising a force of tightening or a force of stretching of the knit fabric and friction between the covering and the rotating support member that supports the covering, dislocation prevention making use of engagement between recesses and projections of the knit fabric, dislocation prevention making use of engagement between protrusion-like regions or hook-like regions on the rotating support member and gaps in mesh at the knit fabric constituting the covering, prevention of dislocation between the covering and the rotating support body in which a force of tightening due to tension produced by stretchability of the knit fabric which is made to contain elastic fiber having stretchability and high coefficient of friction at the yarn which is made to comprise a plurality of filaments employed in the covering comprising the knit fabric and a gripping force produced by friction between this elastic fiber and the rotating support body are obtained, covering dislocation prevention in which the surface of the rotating support body is covered by an elastic body having a coefficient of friction higher than a coefficient of friction of the knit fabric and making use of a force of tightening produced by tension between the elastic body and the rotating support body covered thereby, and bonding making use of thermal fusing or bonding making use of pressure-sensitive adhesive or non-pressure-sensitive adhesive.

4. The roller according to claim 3, wherein the yarn comprising a plurality of filaments is yarn forming the knit fabric constituting the covering that covers the surface of the roller; and the knit fabric is knit fabric selected from among knit fabric in the form of a plated-yarn-knit that is knit such that plated with monofilament at a core yarn is a stretchable elastic fiber having a coefficient of friction higher than a coefficient of friction of the core yarn, knit fabric that is knit using twisted yarn in which the yarn contains twisted therewithin stretchable elastic fiber of high coefficient of friction; and knit fabric that is knit using covered yarn in which the core yarn is monofilament and the covering yarn comprises a stretchable elastic fiber having a coefficient of friction higher than a coefficient of friction of the core yarn; such knit fabric being used as the covering at the surface of the roller.

5. The roller according to claim 4, wherein the knit fabric that is knit using twisted yarn containing twisted therewithin stretchable elastic fiber is such that the stretchable elastic fiber has a melting point which is lower than that of other filament; flexural stress and heat-setting during knitting cause the filament to undergo plastic deformation, and fusing of the low-melting-point stretchable elastic fiber causes the intersecting and entangled state to be stabilized, preventing fraying of the yarn; and this knit fabric is used as covering at the surface of the roller.

6. The roller according to claim 3, wherein the covering comprising the knit fabric is such that a core yarn in the yarn employed at the knit fabric is yarn comprising monofilament, being yarn comprising filament which is such that flexural stress or heat causing the monofilament yarn to undergo plastic deformation at locations where this yarn filament mutually intersects and becomes entangled; or the yarn employed in the knit fabric is yarn comprising a plurality of filaments, this yarn including filament exhibiting plastic deformation as a result of exposure to a prescribed amount of heat, flexural stress and a prescribed amount of heat causing the yarn to undergo plastic deformation at locations where the yarn mutually intersects and becomes entangled, such that the entangled state is maintained; being knit fabric at which fraying of yarn is prevented; being a knit pattern in which pitch of stitch loops in the stitch direction constituting the axial direction is smaller than pitch of stitch loops in the gauge direction constituting the rotational direction of the roller; a state is maintained in which mutually contacting stitch loops are deformed and loop filament is entangled, as a result of which increased strength is present in the rotational direction due to mutual intertwining of filament and loop density in the axial direction; the knit fabric being such that fraying of the yarn at the covering in the context of rubbing or compression during rotation is prevented by plastic deformation of the filament; and the covering comprising this knit fabric being provided at the surface of the rotating support body which rotates.

7. The roller according to claim 1, wherein the covering comprising the knit fabric is such that a core yarn in the yarn employed at the knit fabric is yarn comprising monofilament, being yarn comprising filament which is such that flexural stress or heat causing the monofilament yarn to undergo plastic deformation at locations where this yarn filament mutually intersects and becomes entangled; or the yarn employed in the knit fabric is yarn comprising a plurality of filaments, this yarn including filament exhibiting plastic deformation as a result of exposure to a prescribed amount of heat, flexural stress and a prescribed amount of heat causing the yarn to undergo plastic deformation at locations where the yarn mutually intersects and becomes entangled, such that the entangled state is maintained; being knit fabric at which fraying of yarn is prevented; being a knit pattern in which pitch of stitch loops in the stitch direction constituting the axial direction is smaller than pitch of stitch loops in the gauge direction constituting the rotational direction of the roller; a state is maintained in which mutually contacting stitch loops are deformed and loop filament is entangled, as a result of which increased strength is present in the rotational direction due to mutual intertwining of filament and loop density in the axial direction; the knit fabric being such that fraying of the yarn at the covering in the context of rubbing or compression during rotation is prevented by plastic deformation of the filament; and the covering comprising this knit fabric being provided at the surface of the rotating support body which rotates.

8. The roller according to claim 7, wherein the yarn comprising a plurality of filaments is yarn forming the knit fabric constituting the covering that covers the surface of the roller; and the knit fabric is knit fabric selected from among knit fabric in the form of a plated-yarn-knit that is knit such that plated with monofilament at a core yarn is a stretchable elastic fiber having a coefficient of friction higher than a coefficient of friction of the core yarn, knit fabric that is knit using twisted yarn in which the yarn contains twisted therewithin stretchable elastic fiber of high coefficient of friction; and knit fabric that is knit using covered yarn in which the core yarn is monofilament and the covering yarn comprises a stretchable elastic fiber having a coefficient of friction higher than a coefficient of friction of the core yarn; such knit fabric being used as the covering at the surface of the roller.

9. A roller having a surface comprising knit fabric according to claim 2, wherein the covering comprising the knit fabric is such that a core yarn in the yarn employed at the knit fabric is yarn comprising monofilament, being yarn comprising filament which is such that flexural stress or heat causing the monofilament yarn to undergo plastic deformation at locations where this yarn filament mutually intersects and becomes entangled; or the yarn employed in the knit fabric is yarn comprising a plurality of filaments, this yarn including filament exhibiting plastic deformation as a result of exposure to a prescribed amount of heat, flexural stress and a prescribed amount of heat causing the yarn to undergo plastic deformation at locations where the yarn mutually intersects and becomes entangled, such that the entangled state is maintained; being knit fabric at which fraying of yarn is prevented; being a knit pattern in which pitch of stitch loops in the stitch direction constituting the axial direction is smaller than pitch of stitch loops in the gauge direction constituting the rotational direction of the roller; a state is maintained in which mutually contacting stitch loops are deformed and loop filament is entangled, as a result of which increased strength is present in the rotational direction due to mutual intertwining of filament and loop density in the axial direction; the knit fabric being such that fraying of the yarn at the covering in the context of rubbing or compression during rotation is prevented by plastic deformation of the filament; and the covering comprising this knit fabric being provided at the surface of the rotating support body which rotates.

10. An apparatus employing the roller according to claim 1, wherein the roller is employed as at least one means among object supply means, object conveyance means, object cooling means, or object suction means, or as drive means in at least one means thereamong.

11. An apparatus employing the roller according to claim 2, wherein the roller is employed as at least one means among object supply means, object conveyance means, object cooling means, or object suction means, or as drive means in at least one means thereamong.

12. An apparatus employing the roller according to claim 3, wherein the roller is employed as at least one means among object supply means, object conveyance means, object cooling means, or object suction means, or as drive means in at least one means thereamong.

13. An apparatus employing the roller according to claim 7, wherein the roller is employed as at least one means among object supply means, object conveyance means, object cooling means, or object suction means, or as drive means in at least one means thereamong.

14. An apparatus employing the roller according to claim 4, wherein the roller is employed as at least one means among object supply means, object conveyance means, object cooling means, or object suction means, or as drive means in at least one means thereamong.

15. An apparatus employing the roller according to claim 5, wherein the roller is employed as at least one means among object supply means, object conveyance means, object cooling means, or object suction means, or as drive means in at least one means thereamong.

* * * * *